United States Patent
Shroff et al.

(10) Patent No.: US 11,842,318 B2
(45) Date of Patent: *Dec. 12, 2023

(54) SHARING LOCATION INFORMATION WITH A RECIPIENT

(71) Applicant: United Parcel Service of America, Inc., Atlanta, GA (US)

(72) Inventors: Sumeet Pradeep Shroff, Chamblee, GA (US); Kenny Takano Takahashi, Sandy Springs, GA (US); Jeffrey J. Horne, Alpharetta, GA (US); Thomas V. Hoffmann, Atlanta, GA (US); Michael J. Donohue, Cumming, GA (US); Ferdinand So, Suwanee, GA (US); Julian Pulfrey, Jacksonville, MD (US); Michael Kerr, Owings Mills, MD (US); Larry Augsburger, Freeland, MD (US); Todd Brown, Fallston, MD (US); Susan Ruggles, Westminster, MD (US); Shane Hennessy, New Freedom, PA (US); John Brelesky, Fallston, MD (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 138 days.

This patent is subject to a terminal disclaimer.

(21) Appl. No.: 17/379,673

(22) Filed: Jul. 19, 2021

(65) Prior Publication Data

US 2022/0027846 A1    Jan. 27, 2022

Related U.S. Application Data

(63) Continuation of application No. 15/600,069, filed on May 19, 2017, now Pat. No. 11,151,510.

(Continued)

(51) Int. Cl.
*G06Q 10/0833* (2023.01)
*G06F 16/9535* (2019.01)
(Continued)

(52) U.S. Cl.
CPC ..... *G06Q 10/0833* (2013.01); *G06F 16/9535* (2019.01); *G06F 16/9537* (2019.01);
(Continued)

(58) Field of Classification Search
CPC .................. G06Q 10/0832; G06Q 10/0833
(Continued)

(56) References Cited

U.S. PATENT DOCUMENTS 7,624,024 B2   11/2009   Levis et al.
9,222,781 B2   12/2015   Schenken et al.
(Continued)

FOREIGN PATENT DOCUMENTS

WO    WO-2018035578 A1 *   3/2018    ............... B64D 1/08

OTHER PUBLICATIONS

"UPS Changes the Delivery Game with New Intercept Service," Business Wire, Mar. 26, 2007 (Year: 2007).*
(Continued)

*Primary Examiner* — Omar Zeroual
*Assistant Examiner* — Brian Adams Heflin
(74) *Attorney, Agent, or Firm* — SHOOK, HARDY & BACON L.L.P.

(57) ABSTRACT

Computer program products, methods, systems, apparatus, and computing entities for tracking an item delivery are provided. In one embodiment, an item is associated with a vehicle (e.g., manned or unmanned terrestrial vehicle, nautical vehicle, and/or aerial vehicle) by updating item data in a database. An item tracking session is then generated based on the item data. Upon the determination that session availability trigger has occurred, access to the item tracking
(Continued)

session is provided to a user. Data representing an updated location of the delivery vehicle is then used to update the item data to indicate the current location of the item as the updated location of the vehicle.

20 Claims, 21 Drawing Sheets

Related U.S. Application Data

(60) Provisional application No. 62/339,319, filed on May 20, 2016.

(51) Int. Cl.
*G06F 16/9537* (2019.01)
*H04W 4/029* (2018.01)
*G06Q 10/0832* (2023.01)
*G11B 27/28* (2006.01)
*G06F 16/29* (2019.01)
*H04W 4/021* (2018.01)
*H04W 4/40* (2018.01)

(52) U.S. Cl.
CPC ......... *G06Q 10/0832* (2013.01); *G11B 27/28* (2013.01); *H04W 4/029* (2018.02); *G06F 16/29* (2019.01); *H04W 4/021* (2013.01); *H04W 4/40* (2018.02)

(58) Field of Classification Search
USPC ....................................................... 705/333
See application file for complete search history.

(56) References Cited

U.S. PATENT DOCUMENTS

| | | | |
|---|---|---|---|
| 10,037,582 B2 | 7/2018 | Carey et al. | |
| 10,282,766 B2 | 5/2019 | Rellas et al. | |
| 10,445,682 B2* | 10/2019 | Tibbs ................. | G06Q 10/0833 |
| 11,405,745 B2* | 8/2022 | Jensen ................. | G07C 5/008 |
| 2002/0188702 A1* | 12/2002 | Short, III ............. | G06Q 10/083 |
| | | | 709/220 |
| 2004/0211834 A1* | 10/2004 | Fleckenstein ......... | G06Q 10/08 |
| | | | 235/385 |
| 2006/0145837 A1* | 7/2006 | Horton ................. | G08G 1/202 |
| | | | 340/539.13 |
| 2010/0241349 A1* | 9/2010 | Wu ........................ | G06Q 50/30 |
| | | | 705/338 |
| 2012/0030133 A1* | 2/2012 | Rademaker ............ | G06Q 10/08 |
| | | | 705/333 |
| 2013/0103606 A1 | 4/2013 | Holliday | |
| 2013/0151436 A1* | 6/2013 | Klingenberg ........ | G06Q 10/083 |
| | | | 705/341 |
| 2013/0346336 A1 | 12/2013 | Murphy et al. | |
| 2014/0121958 A1* | 5/2014 | Schenken ............. | H04W 4/021 |
| | | | 701/408 |
| 2014/0149308 A1* | 5/2014 | Ming ................. | G06Q 10/0833 |
| | | | 705/333 |
| 2014/0201001 A1 | 7/2014 | Rellas et al. | |
| 2014/0222711 A1 | 8/2014 | Tibbs et al. | |
| 2015/0081587 A1 | 3/2015 | Gillen | |
| 2015/0100514 A1* | 4/2015 | Parris ................. | G06Q 10/0837 |
| | | | 705/340 |
| 2015/0154559 A1* | 6/2015 | Barbush ............... | G06Q 10/047 |
| | | | 705/338 |
| 2015/0242972 A1* | 8/2015 | Lemmey .............. | G05D 1/0077 |
| | | | 705/80 |
| 2015/0279216 A1* | 10/2015 | Ghanma ................ | G08G 1/202 |
| | | | 705/7.15 |
| 2015/0363843 A1 | 12/2015 | Loppatto et al. | |
| 2016/0019644 A1 | 1/2016 | Boudreault et al. | |
| 2016/0044466 A1 | 2/2016 | Branson et al. | |
| 2017/0337510 A1 | 11/2017 | Shroff et al. | |

OTHER PUBLICATIONS

"UPS now lets you track packages for real—on an actual map," by Chris Welch, May 12, 2016 (Year: 2016).*
"This Is UPS 'Latest Move to Fight Package Thieves'," by John Patrick Pullen, May 12, 2016 (Year: 2016).*
Tracking Event Descriptions, UPS, Available online at: <https ://www. ups.com/us/en/tracking/tracking/description.page>, Apr. 5, 2018, pp. 1-3.
UPS Changes the Delivery Game with New Intercept Service, Business Wire, Mar. 26, 2007, 2 pages.
Welch, Chris, "UPS Now Lets You Track Packages for Real—On an Actual Map", May 12, 2016, 2 pages.
William, Hoffman, "UPS Expands Tracking Technology", HIS Maritime & Trade, Mar. 26, 2007, 4 pages.
Office Action received for Canadian Patent Application No. 3023635, dated Oct. 19, 2021, 7 pages.

* cited by examiner

SHARING LOCATION INFORMATION WITH A RECIPIENT

CROSS-REFERENCE TO RELATED APPLICATIONS

The present application is a Continuation Application of U.S. application Ser. No. 15/600,069, filed on May 19, 2017, which in turn claims the benefit of U.S. Provisional Patent Application No. 62/339,319, filed on May 20, 2016, the contents of which are hereby incorporated by reference in their entireties.

BACKGROUND

Recipients of shipments/items consistently desire more transparency in tracking the location of their shipments/items during the delivery process. Accordingly, improved shipment/item tracking systems and methods providing shipment/item recipients with greater information/data regarding the current location of their shipments/items are needed.

BRIEF SUMMARY

In general, embodiments of the present invention provide methods, apparatus, systems, computing devices, computing entities, and/or the like for sharing location information with a recipient. In accordance with one example embodiment, a method is provided for tracking delivery of an item. The method includes associating the item with a vehicle by updating item data in a database, generating an item tracking session based on the item data identifying a current location of the item, determining a session availability trigger has occurred, and providing access to the item tracking session to a user in response to determination that the session availability trigger has occurred. The method also includes receiving data representing an updated location of the vehicle, and updating the item data and the item tracking session to indicate the current location of the item is the updated location of the vehicle.

In one example embodiment, the method further includes comparing item transit progress against access level criteria, and modifying data available via the tracking session upon determining that one or more access level criteria are satisfied.

In one example embodiment of the method, the item tracking session identifying the current location of the item includes renderable map data identifying the current location of the item, and updating the item tracking session to indicate the current location of the item is the current location of the vehicle further comprises further method steps. The further steps may include determining multiple access views of the renderable map data, wherein the multiple views comprise at least a wide view of the renderable map data associated with a first range of locations of the vehicle, a moderate view of the renderable map data associated with a second range of locations of the vehicle, and a close view of the renderable map data associated with a third range of locations of the vehicle. The further steps may also include determining that the vehicle is within the second range of locations, providing the renderable map data corresponding to the moderate view of the map to the user, determining that the vehicle is within the third range of locations, and providing the renderable map data corresponding to the close view of the map to the user.

In an example embodiment of the method, the renderable map data further comprises an icon representing the location of the item, wherein the icon is a first size on the map representing the location of the vehicle and wherein updating the item tracking session further comprises additional method steps. The additional method steps may include determining that the vehicle is within the second range of locations, changing the icon to a second size in the renderable map data, wherein the second size provides a more specific location than the first size, determining that the vehicle is within the third range of locations, and changing the icon to a third size in the renderable map data, wherein the third size provides a more specific location than the first size.

In an example embodiment of the method, updating the item tracking session to indicate the current location of the item is the current location of the vehicle further includes one of: updating the item tracking session continuously, updating the item tracking session at least once during a first time period, wherein the first time period comprises a range of one minutes to five minutes, or updating the item tracking session at least once during a second time period, wherein the second time period comprises a range of five minutes to fifteen minutes.

In an example embodiment of the method, providing access to the item tracking session to the user includes generating a map access link, wherein selection of the map access link by the user provides renderable map data to the user, generating a map available notification, wherein the map available notification comprises the map access link, and delivering the map available notification to the user.

In an example embodiment of the method, the notification is delivered to the user using one or more of an email, a short message service, or a notification in a user delivery profile.

In an example embodiment of the method, determining the session availability trigger has occurred includes one or more of: determining the item is associated with the vehicle, determining the item is within a delivery time window, or receiving a request to view the item tracking session from the user.

In an example embodiment, the method further includes receiving a tracking completion signal.

In an example embodiment, the method further includes restricting the user's access to the item tracking session upon receiving a tracking completion signal.

In an example embodiment, the method further includes receiving a tracking completion signal further includes receiving one or more of: a delivery completed notification, a delivery not completed notification, a tracking error notification, or a tracking time out notification.

In an example embodiment, the method further includes receiving a delivery action request from the user, wherein the delivery action request indicates a desired user change to the item delivery, wherein the desired user change comprises one or more of a user selection to intercept the vehicle to accept delivery of the item, a user selection of a new delivery address for the item, a user selection to accept delivery of the item at a retail location, or a user selection to accept delivery of the item at an access point. The method may also include determining that the delivery action request has been granted, determining that the desired user change to the item delivery has been completed, and updating the item tracking session according to completed desired change.

In an example embodiment of the method, the vehicle is selected from a group consisting of a manned terrestrial vehicle, an unmanned terrestrial vehicle, and an unmanned aerial vehicle.

In another example embodiment, an apparatus is provided for tracking delivery of an item. The apparatus includes at least one processor and at least one memory including program code, the at least one memory and the program code configured to, with the processor, cause the apparatus to associate the item with a vehicle by updating item data in a database, generate an item tracking session based on the item data identifying a current location of the item, determine a session availability trigger has occurred, provide access to the item tracking session to a user in response to determination that the session availability trigger has occurred, receive data representing an updated location of the vehicle, and update the item data and the item tracking session to indicate the current location of the item is the updated location of the vehicle.

The at least one memory and the program code may be further configured to, with the processor, cause the apparatus to compare item transit progress against access level criteria and modify data available via the tracking session upon determining that one or more access level criteria are satisfied.

In an example embodiment of the apparatus, the item tracking session identifying the current location of the item comprises renderable map data identifying the current location of the item. The at least one memory and the program code may be further configured to, with the processor, cause the apparatus to determine multiple access views of the renderable map data, wherein the multiple views comprise at least a wide view of the renderable map data associated with a first range of locations of the vehicle, a moderate view of the renderable map data associated with a second range of locations of the vehicle, and a close view of the renderable map data associated with a third range of locations of the vehicle. The at least one memory and the program code may be further configured to, with the processor, cause the apparatus to determine that the vehicle is within the second range of locations, provide the renderable map data corresponding to the moderate view of the map to the user, determine that the vehicle is within the third range of locations, and provide the renderable map data corresponding to the close view of the map to the user.

In an example embodiment of the apparatus, the renderable map data further comprises an icon representing the location of the item, wherein the icon is a first size on the map representing the location of the vehicle. The at least one memory and the program code may be further configured to, with the processor, cause the apparatus to determine that the vehicle is within the second range of locations, change the icon to a second size in the renderable map data, wherein the second size provides a more specific location than the first size, determine that the vehicle is within the third range of locations, and change the icon to a third size in the renderable map data, wherein the third size provides a more specific location than the first size.

In an example embodiment, the at least one memory and the program code may be further configured to, with the processor, cause the apparatus to update the item tracking session continuously, update the item tracking session at least once during a first time period, wherein the first time period comprises a range of one minutes to five minutes, or update the item tracking session at least once during a second time period, wherein the second time period comprises a range of five minutes to fifteen minutes.

In an example embodiment, the at least one memory and the program code may be further configured to, with the processor, cause the apparatus to generate a map access link, wherein selection of the map access link by the user provides renderable map data to the user, generate a map available notification, wherein the map available notification comprises the map access link, and deliver the map available notification to the user.

In an example embodiment of the apparatus, the notification is delivered to the user using one or more of an email, a short message service, or a notification in a user delivery profile.

In an example embodiment, to determine session availability trigger has occurred, the at least one memory and the program code may be further configured to, with the processor, cause the apparatus to determine the item is associated with the vehicle, determine the item is within a delivery time window, or receive a request to view the item tracking session from the user.

In an example embodiment, the at least one memory and the program code may be further configured to, with the processor, cause the apparatus to receive a tracking completion signal. The at least one memory and the program code may be further configured to, with the processor, cause the apparatus to restrict the user's access to the item tracking session upon receiving a tracking completion signal.

In an example embodiment, in order to receive a tracking completion signal, the at least one memory and the program code may be further configured to, with the processor, cause the apparatus to receive one or more of: a delivery completed notification, a delivery not completed notification, a tracking error notification, or a tracking time out notification.

In an example embodiment, the at least one memory and the program code may be further configured to, with the processor, cause the apparatus to receive a delivery action request from the user, wherein the delivery action request indicates a desired user change to the item delivery. The desired user change may comprise one or more of: a user selection to intercept the vehicle to accept delivery of the item, a user selection of a new delivery address for the item, a user selection to accept delivery of the item at a retail location, or a user selection to accept delivery of the item at an access point. The at least one memory and the program code may be further configured to, with the processor, cause the apparatus to determine that the delivery action request has been granted, determine that the desired user change to the item delivery has been completed, and update the item tracking session according to completed desired change.

In an example embodiment of the apparatus, the vehicle is selected from a group consisting of a manned terrestrial vehicle, an unmanned terrestrial vehicle, and an unmanned aerial vehicle.

In accordance with another example embodiment, a non-transitory computer-readable storage medium for tracking an item delivery is provided. In an example embodiment, the non-transitory computer-readable storage medium storing program code instructions that, when executed, cause a computing device to associate the item with a vehicle by updating item data in a database, generate an item tracking session based on the item data identifying a current location of the item, determine a session availability trigger has occurred, provide access to the item tracking session to a user in response to determination that the session availability trigger has occurred, receive data representing an updated location of the vehicle, and update the item data and the item tracking session to indicate the current location of the item is the updated location of the vehicle.

In accordance with another example embodiment, a method is provided for using a user device to track movement of an item during delivery. The method includes receiving, from a server, access to an item tracking session regarding the item, gathering, from the server, data representing a current location of the item, rendering the gathered data to illustrate the current location of the item, receiving a delivery action request from the user, wherein the delivery action request indicates a desired user change to the item delivery, and transmitting the delivery action request to the server.

In one embodiment, the gathered data comprises map data identifying the current location of the item.

In an example embodiment, rendering the gathered data comprises displaying, on a user interface, a map with a wide view of the location of the item.

In an example embodiment, the method further includes receiving a first data update comprising map data, rendering the first data update to provide a map with a moderate view of the location of the item, receiving a second data update comprising map data, and rendering the second data update to provide a map with a close view of the location of the item.

In an example embodiment, the map data comprises a first icon, the first data update comprises a second icon, and the second data update comprises a third icon. In this regard, rendering the gathered data may comprise rendering the first icon in a first size on the map with the first view of the location of the item, rendering the second icon in a second size on the map with the second view of the location of the item, wherein the second size provides a more specific location than the first size, and rendering the third icon in a third size on the map with the third view of the location of the item, wherein the third size provides a more specific location than the second size.

In an example embodiment, the steps of gathering the data representing the current location and rendering the received data include gathering the data representing the current location of the item and rendering the received data continuously, gathering the data representing the current location of the item and rendering the received data at least once during a first time period, wherein the first time period comprises a range of one minutes to five minutes, or gathering the data representing the current location of the item and rendering the received data at least once during a second time period, wherein the second time period comprises a range of five minutes to fifteen minutes.

In an example embodiment, receiving access to the item tracking session comprises receiving a map available notification from the server, wherein the map available notification comprises a map access link, and wherein the method further comprises receiving a user selection of the map access link, and wherein receiving the data representing the current location of the item from the server comprises receiving map data in response to the user selection of the map access link from the server.

In an example embodiment of the method, the map available notification comprises an email, a short message service (SMS) transmission, or a notification within a user delivery profile.

In an example embodiment of the method, the desired user change comprises one or more of: a request to intercept the delivery vehicle to accept delivery of the item, an indication of a new delivery address for the item, a request to accept delivery of the item at a retail location, or a request to accept delivery of the item at an access point.

In an example embodiment, the method also includes receiving, from the server, an indication that the delivery action request has been granted.

In accordance with another example embodiment, an apparatus is provided to track movement of an item during delivery. The apparatus includes at least one processor and at least one memory including program code, the at least one memory and the program code configured to, with the processor, cause the apparatus to receive, from a server, access to an item tracking session regarding the item, gather, from the server, data representing a current location of the item, render the gathered data to illustrate the current location of the item, receive a delivery action request from the user, wherein the delivery action request indicates a desired user change to the item delivery, and transmit the delivery action request to the server.

In an example embodiment of the apparatus, the gathered data comprises map data identifying the current location of the item.

In an example embodiment, in order to render the gathered data, the at least one memory and the program code may be further configured to, with the processor, cause the apparatus to render the map data to provide a map with a wide view of the location of the item.

In an example embodiment, the at least one memory and the program code may be further configured to, with the processor, cause the apparatus to receive a first data update comprising map data, render the first data update to provide a map with a moderate view of the location of the item, receive a second data update comprising map data, and render the second data update to provide a map with a close view of the location of the item.

In an example embodiment of the apparatus, the map data comprises a first icon, the first data update comprises a second icon, and the second data update comprises a third icon, wherein the first icon is rendered in a first size on the map with a wide view of the location of the item, wherein the second icon is rendered in a second size on the map with a moderate view of the location of the item, wherein the second size provides a more specific location than the first size, and wherein the third icon is rendered in a third size on the map with a close view of the location of the item, wherein the third size provides a more specific location than the second size.

In an example embodiment, the at least one memory and the program code may be further configured to, with the processor, cause the apparatus to receive data representing the location of the item and rendering the received data continuously, receive data representing the location of the item and rendering the received data at least once during a first time period, wherein the first time period comprises a range of one minutes to five minutes, or receive data representing the location of the item and rendering the received data at least once during a second time period, wherein the second time period comprises a range of five minutes to fifteen minutes.

In an example embodiment, in order to receive access to the item tracking session, the at least one memory and the program code may be further configured to, with the processor, cause the apparatus to receive a map available notification from the server, wherein the map available notification comprises a map access link, wherein the at least one memory and the program code may be further configured to, with the processor, cause the apparatus to receive a user selection of the map access link, and receive map data in response to the user selection of the map access link from the server.

In an example embodiment of the apparatus, the map available notification is received as one or more of an email, a short message service, or a notification in a user delivery profile.

In an example embodiment of the apparatus, the desired user change comprises one or more of: a user selection to intercept the delivery vehicle to accept delivery of the item, a user selection of a new delivery address for the item, a user selection to accept delivery of the item at a retail location, or a user selection to accept delivery of the item at an access point.

In an example embodiment, the at least one memory and the program code may be further configured to, with the processor, cause the apparatus to receive an indication that the delivery action request has been granted from the server.

In accordance with another example embodiment, a non-transitory computer-readable storage medium for tracking an item delivery is provided. In an example embodiment, the non-transitory computer-readable storage medium storing program code instructions that, when executed, cause a computing device to receive, from a server, access to an item tracking session regarding the item, gather, from the server, data representing a current location of the item, render the gathered data to illustrate the current location of the item, receive a delivery action request from the user, wherein the delivery action request indicates a desired user change to the item delivery, and transmit the delivery action request to the server.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1A:
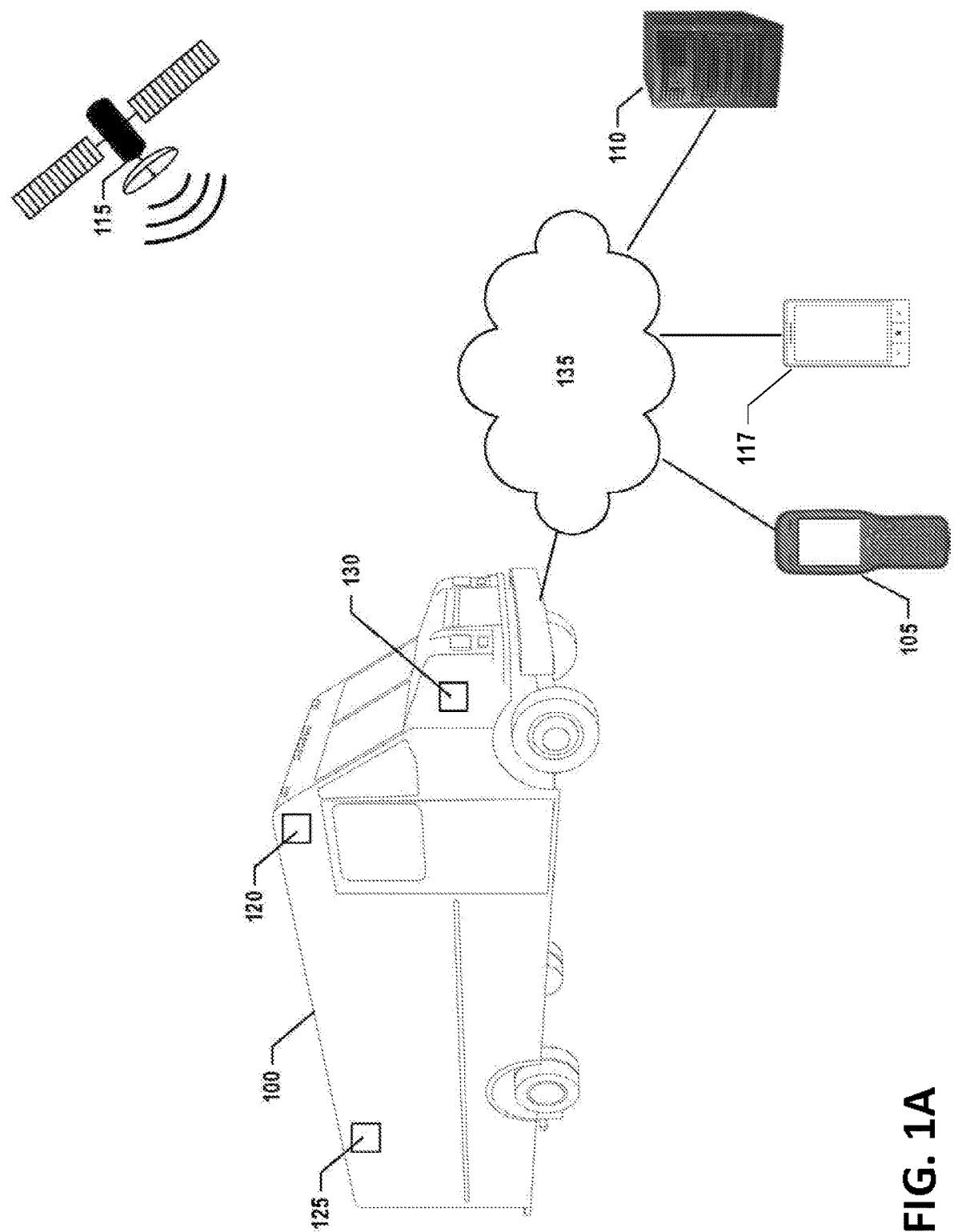
FIG. 1A is a diagram of a system that can be used to practice various embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are configured to provide shipment/item recipients with detailed information/data regarding the current location of a shipment/item in transit prior to final delivery of the shipment/item to the recipient (or a particular destination location associated with the recipient). In particular, various embodiments provide detailed location information/data for each shipment/item based on determined current locations of vehicles carrying each shipment/item. For example, the location information/data for a shipment/item may be determined based on the location of a vehicle, as discussed in U.S. patent application Ser. No. 14/556,972, filed Dec. 1, 2014, the entirety of which is incorporated herein by reference.

Accordingly, for shipment/item transportation strategies in which shipments/items are loaded onto various types of vehicles for transportation and delivery to their respective intended destinations, the location of each shipment/item loaded onto a particular vehicle may be estimated based on a known location of the vehicle itself, as determined by location sensors in the vehicle or in a mobile computing device carried by a vehicle operator. Various embodiments thus utilize the location of the containing vehicle (and/or the location of the mobile computing entity 105 carried by the vehicle operator) as the location of a particular shipment/item, and may provide access to a tracking session, such as through a graphical user interface to a shipment/item recipient indicating the location of the shipment/item on a map as it is transported to its respective final destination location.

Once the shipment/item is delivered to its final destination location, the location of the vehicle is no longer an acceptable proxy for the location of the shipment/item. Accordingly, various embodiments disassociate the shipment/item from the vehicle, and/or otherwise terminate sharing of the location of the vehicle with the recipient. However, the system may continue to share the location of the vehicle with other shipment/item recipients whose shipments/items have not yet been removed from the vehicle and delivered to their respective destination locations. Accordingly, various embodiments provide sufficient information/data via the generated user interface to enable a shipment/item recipient to determine where his/her shipment/item is located, and to determine when his/her shipment/item has been delivered, without providing superfluous information/data regarding the location of a vehicle that had previously delivered the recipient's shipment/item, once the shipment/item has been delivered.

Moreover, various embodiments limit the amount of information/data available to an intended recipient of a shipment/item prior to delivery of the shipment/item as well.

Figure 9A:
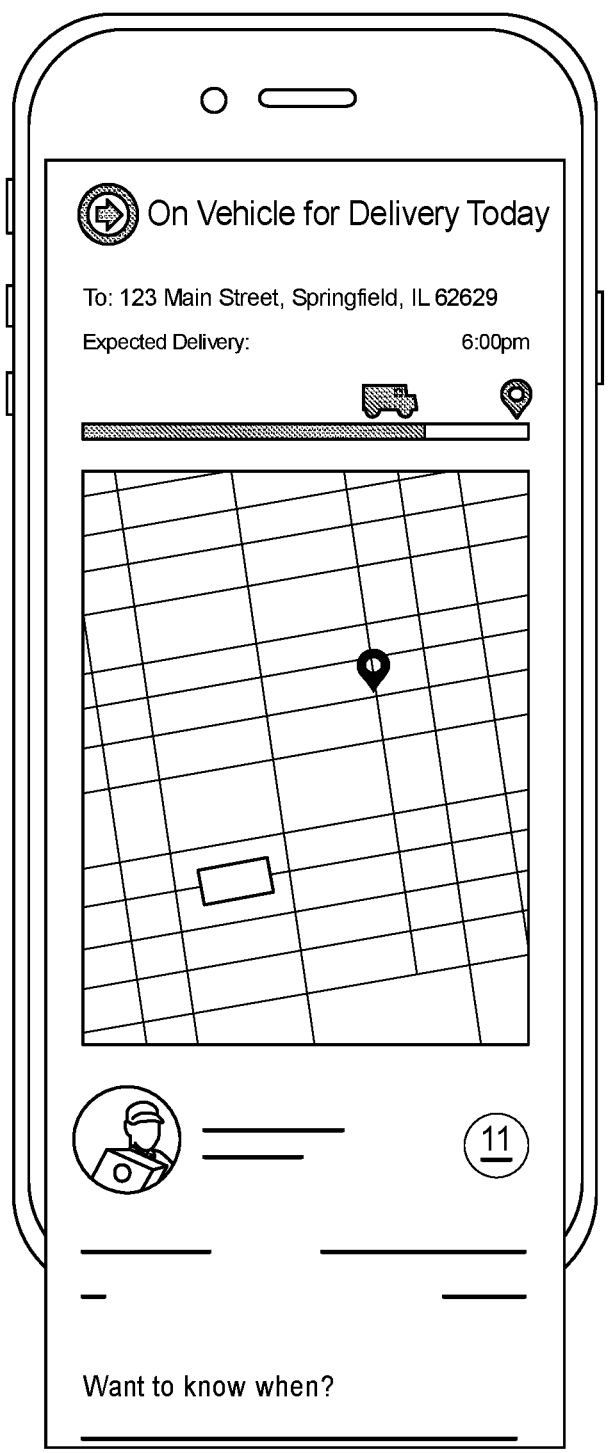
Figure 9B:
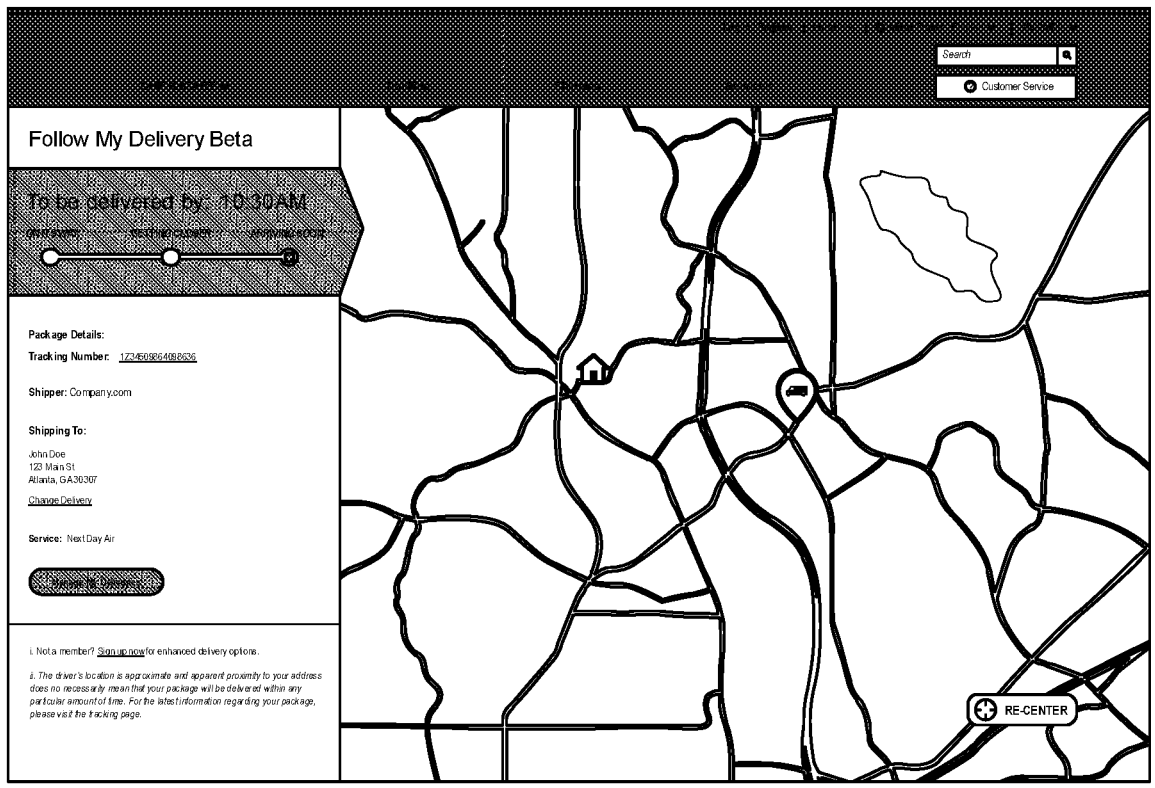
Figure 9C:

For example, because the precise location of a shipment/item scheduled to be delivered several hours in the future may be more information than the recipient needs to plan his/her day around an expected shipment/item delivery, various embodiments limit the precision of location information/data provided to the user based on the item's progress toward final delivery of the shipment/item. For example, when a delivery vehicle containing the shipment/item initially leaves a hub location (e.g., operated by a shipment/item carrier/delivery entity), the user interface provided to a shipment/item recipient may provide only information/data indicative of an estimated delivery window for the shipment/item (e.g., delivery expected between 2:00-4:00 PM). As the delivery vehicle progresses along an assigned delivery route, and gets closer in time and/or distance to delivering the shipment/item in question, the user interface provided to the user may be updated to provide additional information/data indicative of an estimated location of the delivery vehicle. For example, the estimated location may cover a large region of a map (e.g., may be shown as a polygon over some region of the map) in which the vehicle is currently located. Thus, although providing more granular information/data than an expected delivery time, some embodiments of the system nevertheless do not enable an intended shipment/item recipient to track the entire delivery route of the vehicle as it progresses from the hub to the final delivery destination for the shipment/item. Example screenshot/mockup of a generic access level providing location information/data and item progress is shown in FIGS. 9B and 9C.

Finally, once the vehicle enters a defined time, distance, and/or number of deliveries prior to delivering the shipment/item in question, the graphical user interface available to the shipment/item recipient is updated to provide a precise location of the vehicle carrying the shipment/item, and/or an expected delivery path between the vehicle current location and the destination location for the shipment/item. The estimated location of the shipment/item may update as the vehicle 100 moves, until the shipment/item is ultimately delivered to the destination location.

After delivery, the shipment/item recipient's access to the shipment/item tracking graphical user interface may be terminated, so that the shipment/item recipient is no longer enabled to monitor the location of the vehicle.

Accordingly, various embodiments enable shipment/item recipients to plan their day around an expected shipment/item delivery, while in some embodiments preventing shipment/item recipients from tracking the exact movements of a delivery vehicle 100 over an entire delivery route. As an expected shipment/item delivery becomes nearer in time, the level of precision of location information/data provided to the shipment/item recipient increases, so that the shipment/item recipient is given sufficient notice of the expected time of delivery.

From the recipient's perspective, the recipient may begin his/her day with an understanding that a shipment/item is likely to be delivered between 4:00 PM-8:00 PM. At the beginning of the day, there is still a great deal of uncertainty regarding the exact time the shipment/item is to be delivered, and so this relatively wide estimated delivery window gives the shipment/item recipient an idea of when he/she should expect delivery of the shipment/item. As the day progresses and the expected delivery time nears, the amount of uncertainty in the expected delivery time may decrease, and so the recipient may be given more precise information/data about the current location of the vehicle and/or a narrowed estimated delivery window (e.g., 5:00 PM-7:00 PM). If the recipient wants to be home to accept delivery, the recipient may then watch the estimated location of the vehicle to make sure he/she plans to be home before the delivery vehicle gets close to the destination location. Finally, when delivery is imminent, the precise location of the delivery vehicle may be provided to the recipient. Thus, the recipient may watch the progress of the vehicle to be sure he/she is available to accept delivery when the vehicle approaches the delivery location.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1A provides an illustration of a system 1 that can be used in conjunction with various embodiments of the present invention. As shown in FIG. 1, the system 1 may include one or more vehicles 100, one or more mobile computing entities 105, one or more carrier computing entities 110, one or more Global Positioning System (GPS) satellites 115, one or more user computing entities 117, one or more location sensors 120, one or more telematics sensors 125, one or more information/data collection devices 130, one or more networks 135, one or more shipments/items, and/or the like. Each of the components of the system 1 may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1A illustrates certain system entities as separate, standalone entities, the various embodiments are not limited to this particular architecture.

Figure 1B:
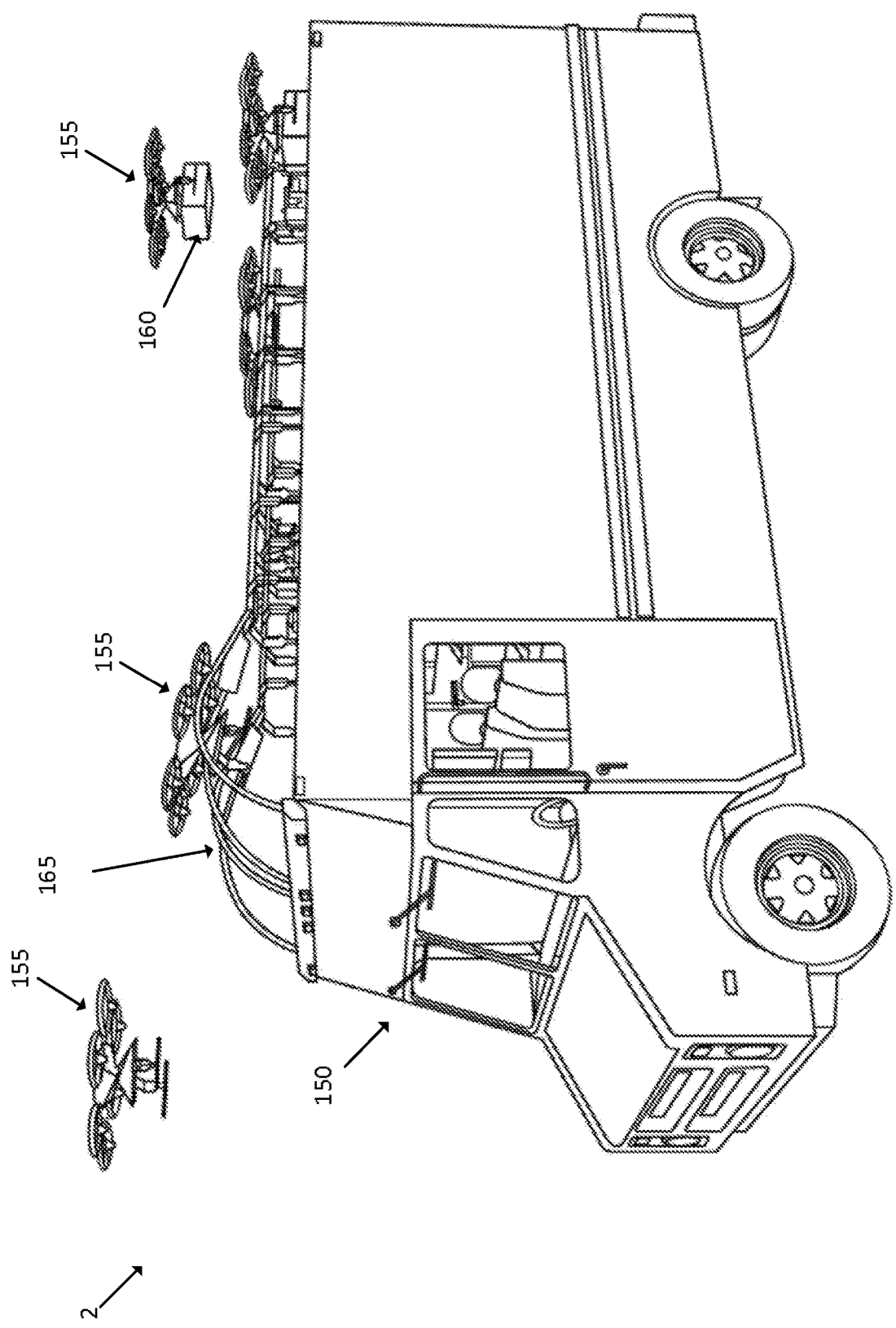
FIG. 1B is a diagram of another system that can be used to practice various embodiments of the present invention.

FIG. 1B shows enhanced parcel delivery system 2 according to one embodiment. In the embodiment of FIG. 1B, the parcel delivery system 2 may be incorporated as part of system 1 and comprise a primary delivery vehicle 150 and a plurality of unmanned aerial vehicles (UAVs) 155 configured to deliver shipment/item 160 from the vehicle 150. According to various embodiments, the UAVs 155 are configured to be dispatched from the vehicle 150, deliver a shipment/item 160 to various delivery locations, and return to the vehicle 150.

In the illustrated embodiment of FIG. 1B, the primary delivery vehicle 150 is a delivery truck configured to be manually or autonomously driven. In some embodiments, the delivery vehicle 150 defines an interior package cabin for storing a plurality of parcels to be delivered by the UAVs 155. The delivery vehicle's roof panel includes UAV support mechanisms 165 configured to enable the UAVs 155 to takeoff from, and land on, the delivery vehicle 150. In some examples, the delivery vehicle 150 is configured such that shipment/items stored in the delivery vehicle's interior package cabin can be secured to one of the UAVs 155 in an automated fashion, such that the UAV to which a particular parcel is secured can then take off from the roof panel of the vehicle 150, deliver the parcel to a delivery location, and return to the vehicle 150 for landing on the roof panel. In this way, the delivery vehicle 150 functions as a mobile hub for UAV-based parcel deliveries. Alternatively, in some embodiments, the UAVs 155 may take off from, and may return to and land on a building or other structure, such as a warehouse.

a. Exemplary Vehicle 100

In various embodiments, the term vehicle 100 is used generically. For example, a vehicle 100 may be a manned or an unmanned terrestrial, aerial, or nautical vehicle—such as a tractor, truck, car, motorcycle, moped, Segway, bicycle, golf cart, hand truck, cart, trailer, tractor and trailer combination, van, flatbed truck, vehicle 100, primary delivery vehicle 150, UAV 155, drone, airplane, helicopter, boat, barge, and/or any other form of object for moving or transporting people and/or items (e.g., one or more packages, parcels, bags, containers, loads, crates, items banded together, vehicle 100 parts, pallets, drums, the like, and/or similar words used herein interchangeably). In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to the vehicle 100.

FIG. 1A shows one or more computing entities, devices, and/or similar words used herein interchangeably that are associated with the vehicle 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein.

Figure 2:
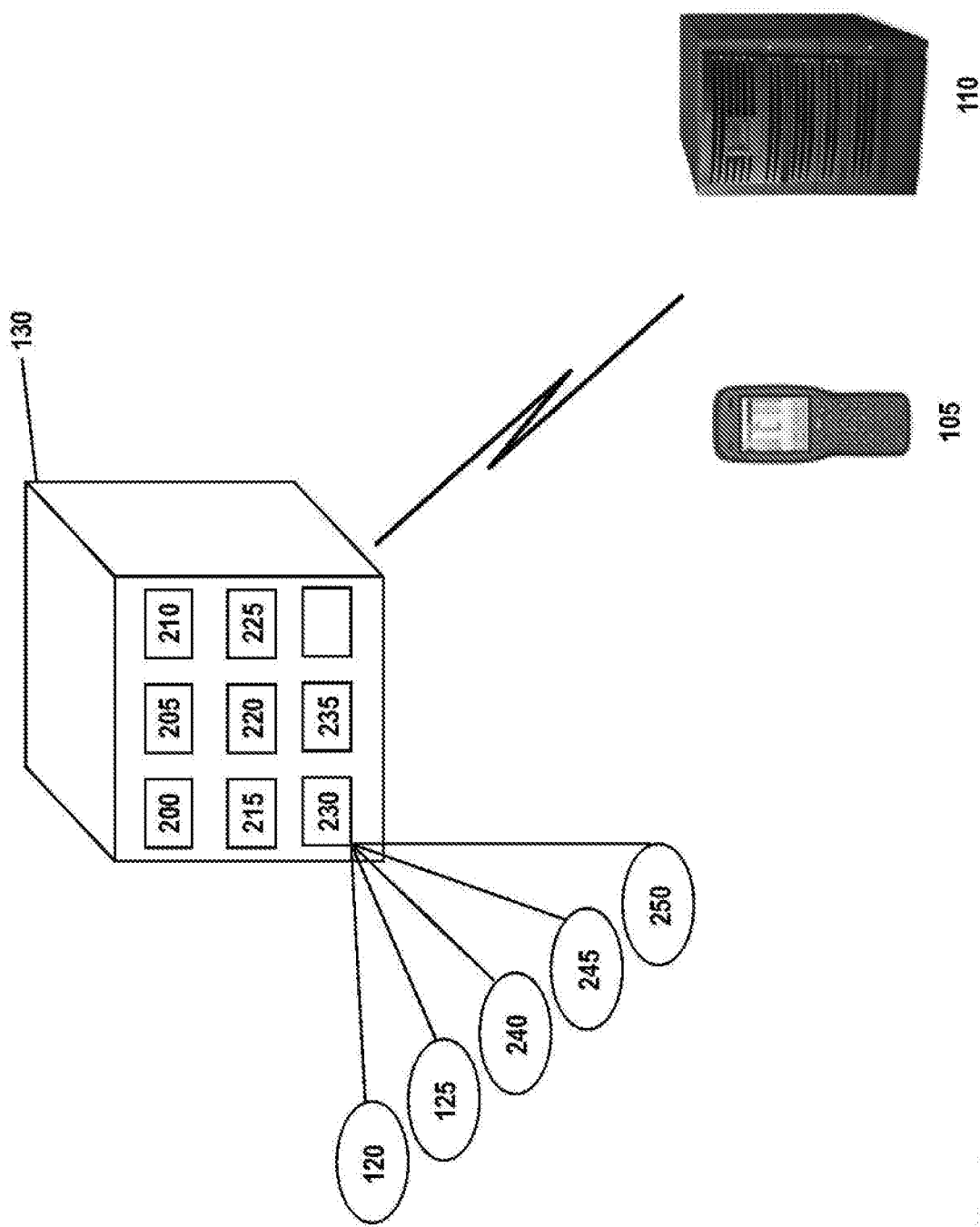
FIG. 2 is a diagram of an information/data collection device that may be used in association with certain embodiments of the present invention.

FIG. 2 provides a block diagram of an exemplary information/data collection device 130 that may be attached, affixed, disposed upon, integrated into, or part of a vehicle 100, primary delivery vehicle 150, or a UAV 155. The information/data collection device 130 may collect telematics information/data (including location information/data) and transmit/send the information/data to the mobile computing entity 105, the carrier computing entity 110, and/or various other computing entities via one of several communication methods.

In one embodiment, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle 100 but external to the information/data collection device 130.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle 100 and/or the vehicle's operator and with various communication points (e.g., cellular towers or Wi-Fi access points) positioned at various locations throughout a geographic area to monitor the location of the vehicle 100, and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the carrier computing entity 110, the information/data collection device 130, mobile computing entity 105, and/or similar computing entities.

As indicated, in addition to the one or more location sensors 120, the information/data collection device 130 may include and/or be associated with one or more telematics sensors 125, modules, and/or similar words used herein interchangeably (e.g., vehicle 100 sensors, such as engine, fuel, odometer, hubometer, tire pressure, location, weight, emissions, door, and speed sensors; environmental sensors, such as air quality sensors and/or temperature sensors; and/or the like).

In one embodiment, the ECM 245 may be one of several components in communication with and/or available to the information/data collection device 130. The ECM 245, which may be a scalable and subservient device to the information/data collection device 130, may have information/data processing capability to decode and store analog and digital inputs from vehicle 100 systems and sensors. The ECM 245 may further have information/data processing capability to collect and present telematics information/data to the J-Bus (which may allow transmission to the information/data collection device 130), and output standard vehicle 100 diagnostic codes when received from a vehicle's 100 J-Bus-compatible on-board controllers 240 and/or sensors.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

b. Exemplary Carrier Computing Entity

Figure 3:
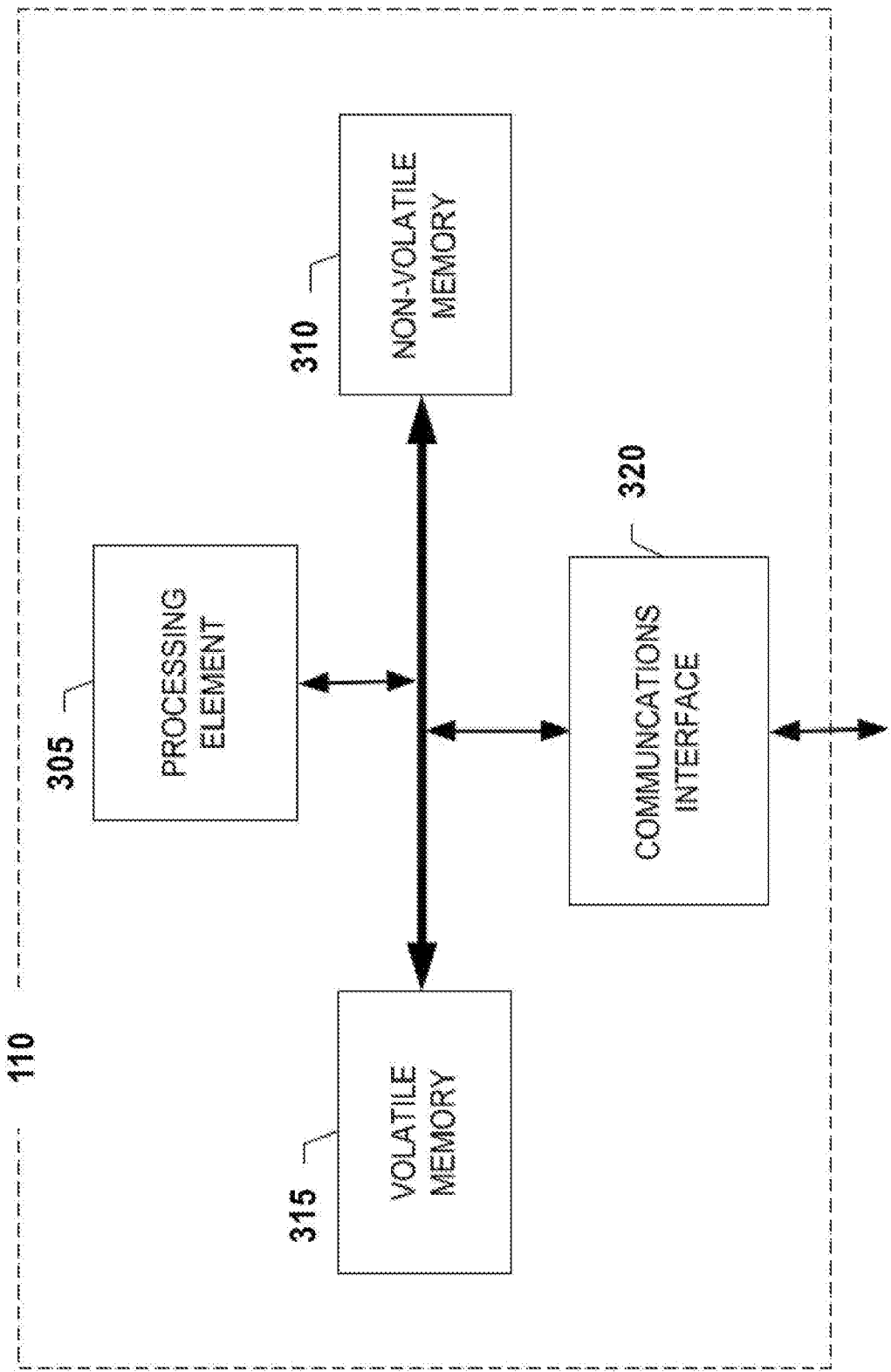
FIG. 3 is a schematic of a carrier computing entity in accordance with certain embodiments of the present invention.

FIG. 3 provides a schematic of a carrier computing entity 110 according to one embodiment of the present invention. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Coyote, Amazon, Google, Uber, ride-sharing services, crowd-sourcing services, retailers, and/or the like.

In general, the terms computing entity, entity, device, system, and/or similar words used herein interchangeably may refer to, for example, one or more computers, computing entities, desktop computers, mobile phones, tablets, phablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the carrier computing entity 110 may communicate with vehicles 100, mobile computing entities 105, and/or the like.

As shown in FIG. 3, in one embodiment, the carrier computing entity 110 may include or be in communication with one or more processing elements 305 (also referred to as processors, processing circuitry, and/or similar terms used herein interchangeably) that communicate with other elements within the carrier computing entity 110 via a bus, for example. As will be understood, the processing element 305 may be embodied in a number of different ways. For example, the processing element 305 may be embodied as one or more complex programmable logic devices, microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the carrier computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the carrier computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the carrier computing entity 110 with the assistance of the processing element 305 and operating system.

As indicated, in one embodiment, the carrier computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the carrier computing entity 110 may communicate with computing entities or communication interfaces of the vehicle 100, mobile computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier computing entity 110 may be configured to communicate via wireless external communication networks using any of a variety of protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the carrier computing entity 110 may include or be in communication with one or more input elements, such as a keyboard input, a mouse input, a touch screen/display input, audio input, pointing device input, joystick input, keypad input, and/or the like. The carrier computing entity 110 may also include or be in communication with one or more output elements (not shown), such as audio output, video output, screen/display output, motion output, movement output, and/or the like.

As will be appreciated, one or more of the carrier computing entity's 110 components may be located remotely from other carrier computing entity 110 components, such as in a distributed system. Furthermore, one or more of the components may be combined and additional components performing functions described herein may be included in the carrier computing entity 110. Thus, the carrier computing entity 110 can be adapted to accommodate a variety of needs and circumstances.

c. Exemplary Mobile Computing Entity

Figure 4:
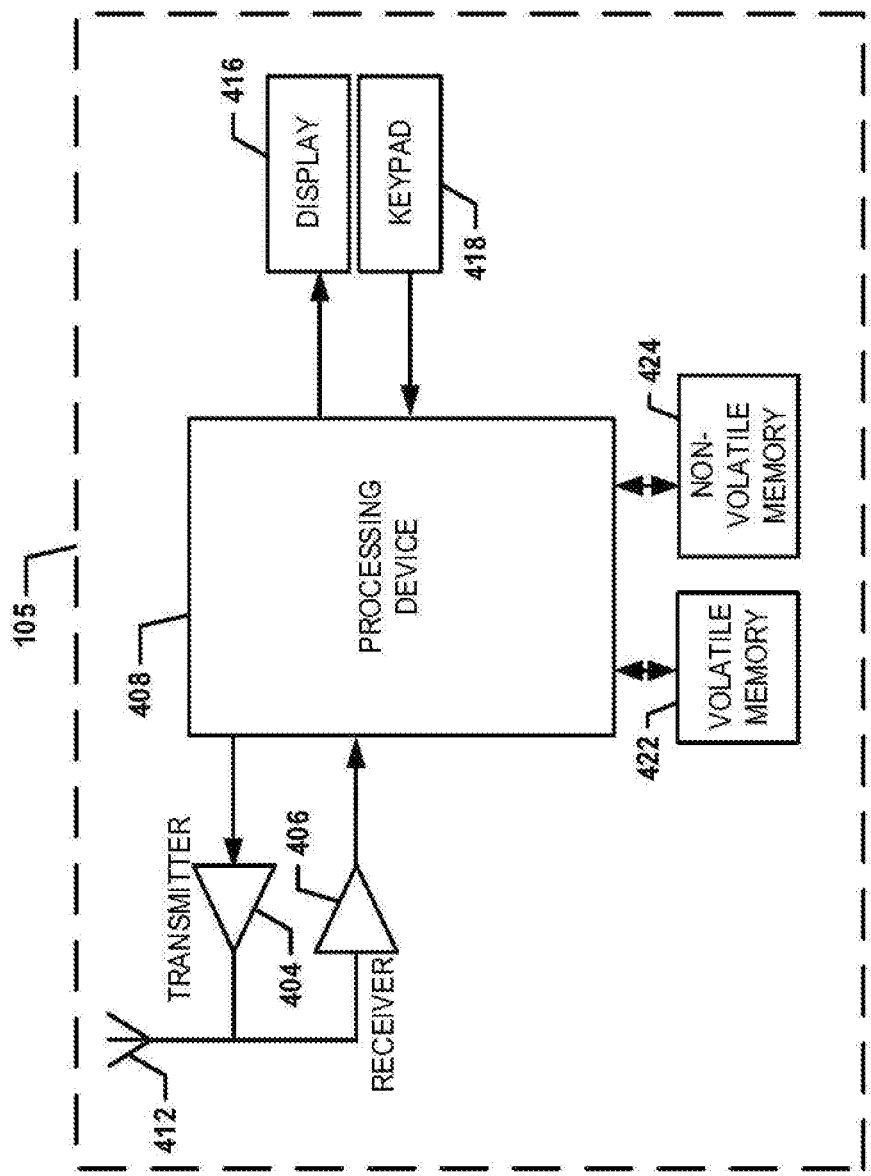
FIG. 4 is a schematic of a mobile computing entity in accordance with certain embodiments of the present invention.

FIG. 4A provides an illustrative schematic representative of a mobile computing entity 105 that can be used in conjunction with embodiments of the present invention. In one embodiment, the mobile computing entities 105 may include one or more components that are functionally similar to those of the carrier computing entity 110 and/or as described below. As will be recognized, mobile computing entities 105 can be operated by various parties, including operators of vehicles 100. As shown in FIG. 4, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 100, carrier computing entities 110, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), and operating system.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing entity 105.

d. Exemplary User Computing Entity

In one embodiment, the user computing entities 117 may each include one or more components that are functionally similar to those of the carrier computing entity 110 and/or the mobile computing entity 105 as described in FIGS. 3 and 4. For example, in one embodiment, each of the user computing entities 117 may include: (1) a processing element that communicates with other elements via a system interface or bus; (2) a user interface; (3) transitory and non-transitory memory; and (4) a communications interface. As previously noted, the user computing entity 117 may comprise a user interface. For example, the user interface may be an application, browser, user interface, dashboard, webpage, and/or similar words used herein interchangeably executing on and/or accessible via the user computing entity 117 to interact with and/or cause display of information/data from the carrier computing entity 110 and/or the mobile computing entity 105, as described herein. These architectures are provided for exemplary purposes only and are not limiting to the various embodiments.

e. Exemplary Shipment/Item

In one embodiment, a shipment/item may be any tangible and/or physical object. In one embodiment, a shipment/item may be or be enclosed in one or more packages, envelopes, parcels, bags, goods, products, containers, loads, crates, items banded together, vehicle parts, pallets, drums, the like, and/or similar words used herein interchangeably. In one embodiment, each shipment/item may include and/or be associated with shipment/item identifier, such as an alphanumeric identifier. Such shipment/item identifiers may be represented as text, barcodes, tags, character strings, Aztec Codes, MaxiCodes, information/data Matrices, Quick Response (QR) Codes, electronic representations, and/or the like. A unique shipment/item identifier (e.g., 123456789) may be used by the carrier to identify and track the shipment/item as it moves through the carrier's transportation network. Further, such shipment/item identifiers can be affixed to shipments/items by, for example, using a sticker (e.g., label) with the unique shipment/item identifier printed thereon (in human and/or machine readable form) or an RFID tag with the unique shipment/item identifier stored therein. Such items may be referred to as "connected" shipments/items and/or "non-connected" shipments/items.

In one embodiment, connected shipments/items include the ability to determine their locations and/or communicate with various computing entities. This may include the shipment/item being able to communicate via a chip or other devices, such as an integrated circuit chip, RFID technology, NFC technology, Bluetooth technology, Wi-Fi technology, and any other suitable communication techniques, standards, or protocols with one another and/or communicate with various computing entities for a variety of purposes. Connected shipments/items may include one or more components that are functionally similar to those of the carrier server 100 and/or the mobile device 110 as described herein. For example, in one embodiment, each connected shipment/item may include one or more processing elements, one or more display device/input devices (e.g., including user interfaces), volatile and non-volatile storage or memory, and/or one or more communications interfaces. In this regard, in some example embodiments, a shipment/item may communicate send "to" address information/data, received "from" address information/data, unique identifier codes, location information/data, status information/data, and/or various other information/data.

In one embodiment, non-connected shipments/items do not typically include the ability to determine their locations and/or might not be able communicate with various computing entities or are not designated to do so by the carrier. The location of non-connected shipments/items can be determined with the aid of other appropriate computing entities. For example, non-connected shipments/items can be scanned (e.g., affixed barcodes, RFID tags, and/or the like) or have the containers or vehicles 100 in which they are located scanned or located. As will be recognized, an actual scan or location determination of a shipment/item is not necessarily required to determine the location of a shipment/item. That is, a scanning operation might not actually be performed on a label affixed directly to a shipment/item or location determination might not be made specifically for or by a shipment/item. For example, a label on a larger container housing many shipments/items can be scanned, and by association, the location of the shipments/items housed within the container are considered to be located in the container at the scanned location. Similarly, the location of a vehicle 100 transporting many shipments/items can be determined, and by association, the location of the shipments/items being transported by the vehicle 100 are considered to be located in the vehicle 100 at the determined location. These can be referred to as "logical" scans/determinations or "virtual" scans/determinations. Thus, the location of the shipments/items is based on the assumption they are within the container or vehicle 100, despite the fact that one or more of such shipments/items might not actually be there.

In various embodiments, shipments/items may have associated shipment/item information/data associated therewith. The shipment/item information/data may be stored in a shipment/item database comprising one or more shipment/item profiles corresponding to each of a plurality of shipments/items. For example, the shipment/item information/data for a particular shipment may comprise information/data indicative of a shipment/item identifier associated with the shipment, an intended destination for the shipment/item, the current location of the shipment, a vehicle 100 and/or storage location containing the shipment/item, and/or the like. In various embodiments, the shipment/item information/data for a particular shipment/item may be updated to reflect current information/data for a particular shipment/item, for example, as the shipment/item is transported by the carrier between an origin and a destination. For example, the current location of a shipment/item may be updated to reflect the current location of the shipment/item. The current location of the shipment/item may be reflective of a precise location determined by, for example, GPS or other location determining devices, or a location relative to other carrier locations (e.g., within a particular carrier hub, within a particular carrier vehicle 100, and/or the like). Moreover, the shipment/item information/data may be indicative of a current status of the shipment/item relative to its intended delivery location. For example, the shipment/item information/data may indicate that a shipment/item is "in transit" while the shipment/item is in the possession of the carrier and prior to delivery, and "delivered" after the shipment/item has been dropped off at its intended destination.

Moreover, in various embodiments, the shipment/item information/data may comprise contact information/data for an entity associated with the shipment/item (e.g., the shipment/item recipient). For example, the contact information/data may comprise an email address, telephone number, social media username (e.g., twitter username, Instagram username, and/or the like), and/or the like. In various embodiments, the contact information/data may be stored in association with shipment/item information/data for a shipment/item based on user input providing information/data specific to a particular shipment/item (e.g., when the shipment/item is provided to the carrier). In certain embodiments, the contact information/data may be obtained automatically from a user profile database comprising information/data for a plurality of shipment/item recipients, shippers, and/or the like. As a non-limiting example, the contact information/data for a particular shipment/item may be identified by comparing the shipment/item information/data for a particular shipment/item against user profile information/data stored in the user profile database. Upon identifying a match between the shipment/item information/data and information/data corresponding to a particular user profile (e.g., based on a match between the destination location for the shipment/item and an address associated with a user profile), contact information/data stored in association with the user profile may be associated with the shipment/item information/data for the shipment/item.

III. Exemplary System Operation a. Exemplary Carrier Computing Entity Operation

As mentioned previously, various embodiments provide a shipment/item recipient/user with information/data regarding the current location of a shipment/item prior to delivery of the shipment/item to an intended destination. In various embodiments, the location of the shipment/item is determined based on the location of a vehicle (e.g., manned or unmanned terrestrial vehicle, nautical vehicle, and/or aerial vehicle) containing the shipment/item (and/or the location of a computing entity carried by a vehicle operator), and accordingly various components of the system are configured to associate the location of the vehicle with shipments/items contained by the vehicle. Moreover, as mentioned, the system may be configured to terminate sharing the location of the shipment/item (as determined by the location of the vehicle) upon receipt of information/data indicating the shipment/item has been delivered. Although the following is described in the context of a terrestrial vehicle 100, it should be recognized that the various embodiments described herein apply to all different types of vehicles described above (e.g., manned or unmanned terrestrial vehicles, nautical vehicles, and/or aerial vehicles), including but not limited to vehicle 100, primary delivery vehicle 150, and UAVs 155.

Figure 5A:
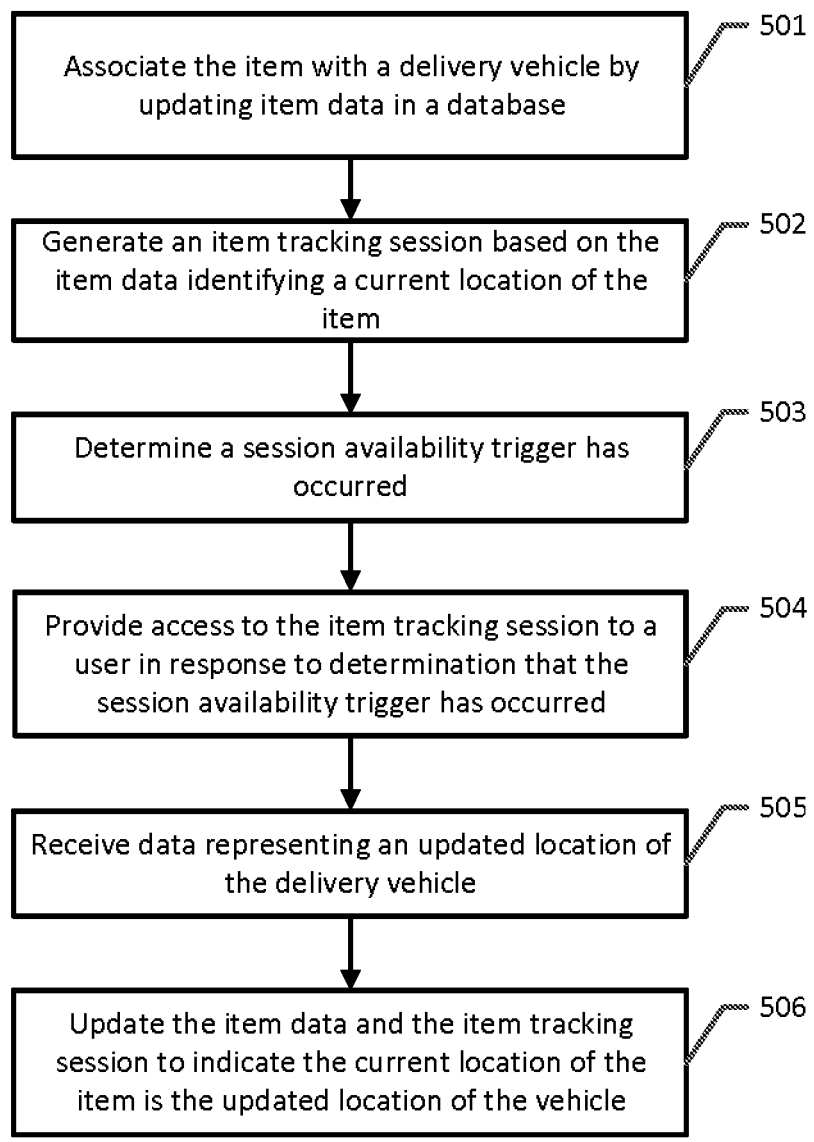
FIG. 5A is a flowchart illustrating operations and processes that can be used in performing various embodiments of the present invention.

FIG. 5A illustrates a flowchart of steps performed for providing information/data indicative of the current location of a shipment/item to a shipment/item recipient/user. Beginning with block 501, a computing entity (e.g., the carrier computing entity 110 may associate the shipment/item with a delivery vehicle by updating item package level detail (shipment/item) information/data in a shipment/item database. In some embodiments, a shipment/item is associated with a particular vehicle 100, such that the location of the shipment/item may be determined based on the location of the vehicle 100. In various embodiments, a shipment/item may be associated with a particular vehicle 100 by updating the shipment/item information/data for a particular shipment/item to include information/data indicative of a vehicle 100 containing the shipment/item, by storing shipment/item information/data for the shipment/item in a memory of the carrier computing entity 110, vehicle 100 and/or mobile computing entity 105 carried by the vehicle operator, and/or the like.

As just one example, the shipment/item may be associated with a particular vehicle 100 (e.g., using a vehicle ID) when the shipment/item is loaded onto the vehicle 100. For example, as a vehicle 100 is being loaded, a mobile computing entity 105 (for example, operated by a loading employee of the carrier) may scan shipment/item indicia on the shipment/item. The mobile computing entity 105 may then associate the scanned shipment/item information/data (e.g., indicia) with a particular vehicle 100 (e.g., by consecutively scanning a vehicle 100 indicia on the vehicle 100 in which the shipment/item is loaded). The mobile computing entity 105 may then transmit information/data indicative of the vehicle 100 to be associated with the shipment/item to the carrier computing entity 110, which may update the shipment/item information/data for the particular shipment/item to reflect the association with the particular vehicle 100.

As another example, the shipment/item may be associated with a particular vehicle 100 when information/data indicative of an assigned vehicle route is stored in a memory device of the carrier computing entity 110, the mobile computing entity 105, and/or the vehicle 100. For example, an assigned vehicle route for a particular vehicle 100 may be stored on the memory of the mobile computing entity 105 to be carried by the operator of the vehicle 100. The assigned vehicle route information/data may comprise information/data indicative of the identity of the shipments/items to be delivered (e.g., a portion of the shipment/item data, such as the shipment/item identifier), as well as their respective destination locations. In various embodiments, the assigned vehicle route may additionally comprise a navigational route to be followed by the vehicle 100 during the delivery route, including an assigned delivery sequence for delivering shipments/items along the assigned delivery route. In this example, shipment/item information/data for the packages to be delivered by the vehicle 100 may be stored on the mobile computing entity 105, which comprises shipment/item information/data associating the shipments/items with the vehicle 100. In such embodiments, the shipment/item information/data stored on a mobile computing entity 105 may be synchronized with shipment/item information/data stored in memory associated with a carrier computing entity 110. In certain embodiments, the shipment/item information/data stored in the memory of the mobile computing entity 105 may be utilized to update location provided via a shipment/item tracking session, as discussed in detail herein. For example, in such embodiments, the shipment/item information/data stored on the mobile computing entity 105 may instruct a web server (and/or the carrier computing entity 110) to generate and/or update shipment/item tracking sessions based on updated shipment/item information/data for shipments/items as stored on the mobile computing entity 105.

By associating the shipment/item with a particular vehicle 100, the location of the shipment/item may be determined based on the location of the vehicle 100 (and/or the location of the mobile computing entity 105 carried by the vehicle operator) as the vehicle 100 traverses the assigned vehicle route. In some examples, the shipment/item may be associated with a particular primary delivery vehicle 150 as the primary delivery vehicle 150 traverses the assigned vehicle route, and may then be associated with a particular UAV 155 in an instance in which the shipment/item is being delivered from the primary delivery vehicle 155 to its intended destination by the UAV 155. Accordingly, the location of the shipment/item may be determined based on the location of the primary delivery vehicle 150 or the UAV 155.

With reference again to FIG. 5A, a computing entity (e.g., the carrier computing entity 110 or a mobile computing entity 105 carried by a delivery vehicle operator) generates a shipment/item tracking session based on the shipment/item shipment/item information/data identifying a current location of the shipment/item as indicated at block 502. In some examples, carrier computing entity 110 or a mobile computing entity 105 generates a shipment/item tracking session for one or more shipments/items located in a particular vehicle 100. As just one example, the carrier computing entity 110 generates a single shipment/item tracking session for each shipment/item to be delivered. Each shipment/item tracking session may be associated with a unique webpage stored in association with a unique shipment/item tracking session identifier (e.g., an alphanumeric character string, such as ABC123). For example, each shipment/item tracking session may be stored on the carrier computing entity 110 and made available to users operating user computing entities 117 (user devices) via a network (e.g., the Internet), or the shipment/item tracking session may be stored on a third party web server and made available to users on user computing entities 117 via a network (e.g., the Internet). Each webpage may be associated with a unique URL, for example, comprising the corresponding unique shipment/item tracking session identifier. For example, the webpage for the above example shipment/item tracking session may be accessible via a URL www.carrier.com/tracking/ABC123.

In various embodiments, the unique shipment/item tracking session identifier may be provided to a shipment/item recipient/user to access the shipment/item tracking session. This shipment/item tracking session identifier may be incorporated into a hyperlink configured to direct a browser (e.g., an internet browser stored on and operated from a user computing entity 117 (e.g., a recipient/user's user computing entity 117)) to the webpage corresponding to the shipment/item tracking session. In various embodiments, a computing entity (e.g., carrier computing entity 110) transmits the shipment/item tracking session identifier and/or the hyperlink to the shipment/item recipient/user to access the webpage corresponding to the shipment/item tracking session.

In various embodiments, the webpage may comprise information/data indicative of the current location of the shipment/item and/or an estimated delivery time (e.g., an estimated delivery time and/or an estimated delivery time window) for the shipment/item. As will be described in greater detail herein, the amount and/or type of information/data displayed via the webpage associated with the shipment/item tracking session may vary based on one or more access level criteria.

In some examples, information/data supplied via the shipment/item tracking session may also include audio information such that a user computing entity may audibly indicate the location of the shipment/item. For example, the information/data may include audio information which audibly indicates an approximate location of the shipment/item in transit, an estimated time of arrival of the shipment item, and/or any of the other information that may be visually provided by the shipment/item tracking session described herein.

With reference again to FIG. 5A, a computing entity (e.g., the carrier computing entity 110) determines that a session availability trigger has occurred, as indicated in block 503. In some examples, this may include determining that the shipment/item is associated with the delivery vehicle such as vehicle 100, determining that the shipment/item is within a delivery time window as described herein, or receiving a request to view the shipment/item tracking session from the user. In some examples, the shipment/item tracking session may be available to a recipient/user as soon as the item is associated with a delivery vehicle, thus when the shipment/item is associated with the delivery vehicle a session availability trigger occurs. In another example, the shipment/item tracking session may be available to a recipient/user when the vehicle is within a delivery window (e.g. the day of delivery, or a time period such as two hours before expected delivery), thus at the beginning of the time period representing the delivery window a session availability trigger occurs. In yet another example, if a recipient/user has requested access to an item tracking session, such as clicking on a link in user profile, a session availability trigger occurs. For example, if a user is expecting a shipment/item delivery on a specific day, he/she may select to view an item tracking session prior to receiving a notification that an item tracking session is available.

Referring again to FIG. 5A, a computing entity (e.g., the carrier computing entity 110) then provides access to the shipment/item tracking session to a user in response to the determination that the session availability trigger has occurred, as indicated at block 504. In some examples, the computing entity provides the shipment/item tracking session to the shipment/item recipient/user and/or one or more other users. For example, in the morning of a delivery day for a shipment/item, the recipient/user is provided an estimated delivery window encompassing a period of time during which delivery of the package is expected (e.g., Your package is scheduled to be delivered between 4:00 PM and 8:00 PM). This estimated delivery window may be based on the vehicle operator's assigned vehicle route for that day.

As previously mentioned, the carrier computing entity 110 may transmit a hyperlink to the shipment/item recipient/user (e.g., via email) that directs the shipment/item recipient/user's user computing entity 117 to a webpage (or other interface) comprising information/data corresponding to the shipment/item tracking session. In various embodiments, access to the shipment/item tracking session may be encrypted, such that the recipient/user (and/or another entity) is required to provide an encryption key (e.g., a password) to access the shipment/item tracking session. In various embodiments, the encryption key may be provided together with the shipment/item tracking session identifier (e.g., the encryption key may be provided by the carrier computing entity 110). However, in certain embodiments, the encryption key may be selected by the recipient/user (and/or another entity). For example, an encryption key may be stored in a user profile as discussed above. Upon determining that the user profile is associated with a particular shipment/item, the encryption key associated with the user profile may be associated with the generated shipment/item tracking session.

In certain embodiments, access to the shipment/item tracking session may be unencrypted, such that anyone with knowledge of the shipment/item tracking session identifier and/or the provided hyperlink may access the shipment/item tracking session. In such embodiments, the shipment/item tracking session identifier may comprise a random and/or pseudo-random generated alphanumeric string in order to minimize the likelihood that an unauthorized entity can simply guess the shipment/item tracking session identifier. However, it should be understood that the shipment/item tracking session identifier for each shipment/item tracking session may be generated in any of a variety of ways, such as sequentially (e.g., each new shipment/item tracking session identifier is generated in increasing sequence), based on information/data stored in a user profile (e.g., a username stored in the user profile), and/or the like.

Figure 5B:
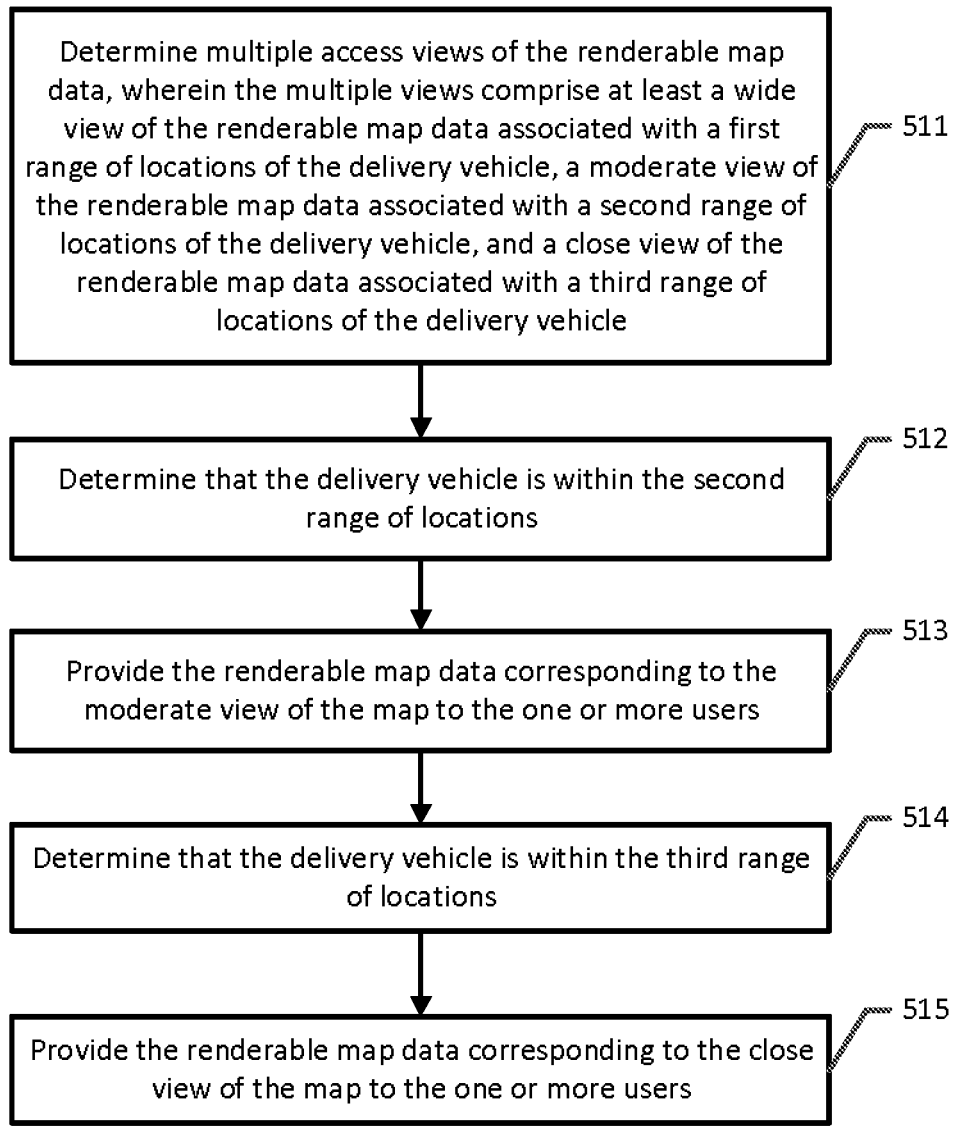
FIGS. 5B-5G are flowcharts illustrating additional operations and processes that can be used in performing various embodiments of the present invention.
Figure 5C:
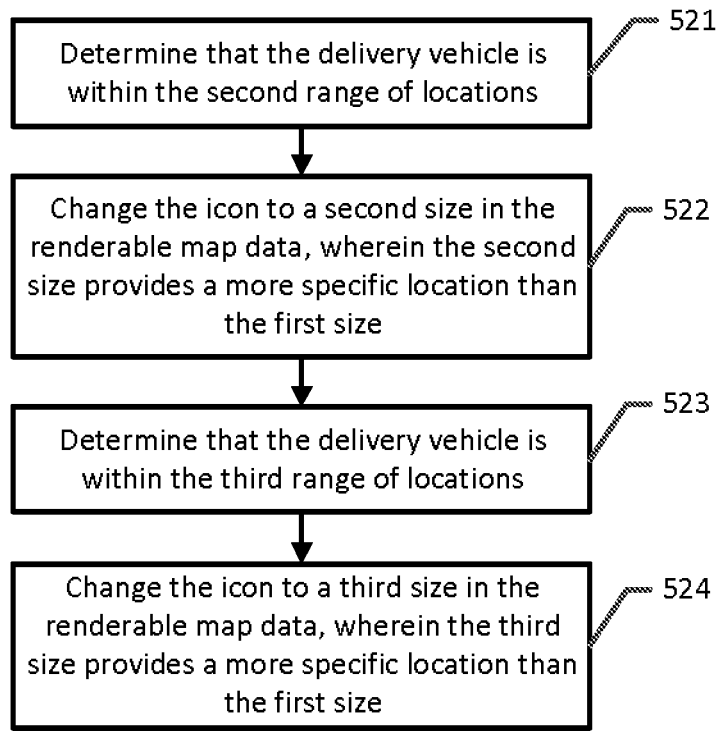
Figure 5D:
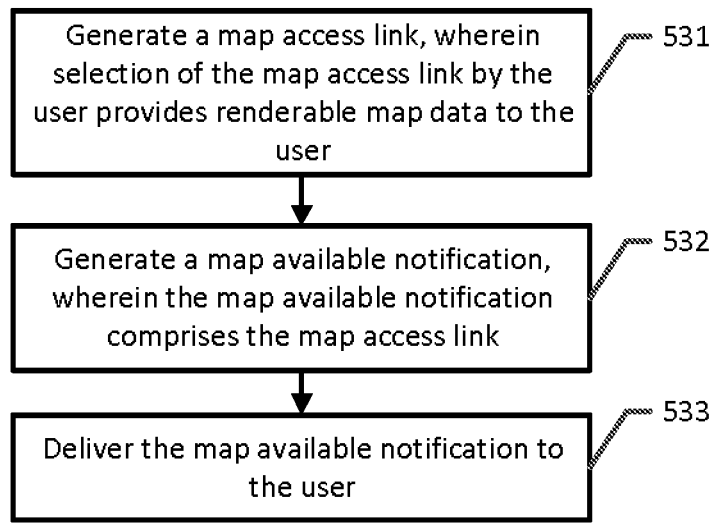

Turning to FIG. 5D, in some embodiments, providing access to the shipment/item tracking session to the user comprises the computing entity 110 generating a map access link, such as the hyperlink discussed above, wherein selection of the map access link by the user provides renderable map information/data to the user via the user computing entity 117, as shown in block 531. In some examples, the renderable map information/data may include location and map viewing size information/data (such as described in FIG. 5C, such that a user computing entity may render the map in a mapping application).

In some examples, the renderable map information/data may additionally or alternatively include audio information such that a user computing entity may audibly indicate the location of the shipment/item. For example, the renderable map information/data may include audio information which audibly indicates the location in transit of the shipment/item, an estimated time of arrival of the shipment item, and/or any of the other information that may be visually provided by a map in a mapping application. In some embodiments, the audio information may include descriptive information which audibly describes an approximate distance (e.g., in miles or kilometers), an expected route of travel to the destination from the location in transit of the shipment/item, traffic along the expected route, or the like.

As shown in block 531, the computing entity may then generate a map available notification, wherein the map available notification comprises the map access link.

The computing entity may then deliver the map available notification to the user through a computing entity such as user computing entity 117, as shown in block 533. In some examples, the notification is delivered to the user using one or more of an email, a short message service, or a notification in a user delivery profile.

With reference again to FIG. 5A, the carrier computing entity 110 may receive information/data representing an updated location of the vehicle, as shown in block 505. In some examples, the computing entity may receive information/data indicative of the current location of the vehicle 100 containing the shipment/item. As previously noted, the shipment/item is associated with a particular vehicle 100 (and/or a mobile computing entity 105 carried by a vehicle operator, primary delivery vehicle 150, or UAV 155), such that the location of the vehicle 100 is indicative of the location of the shipment/item. In various embodiments, the carrier computing entity 110 may receive the current location of the vehicle 100 in response to the occurrence of one or more trigger events. For example, the carrier computing entity 110 may receive the current location of the vehicle 100 in response to a location inquiry (which may be generated upon determining that a shipment/item recipient/user has requested access to the shipment/item tracking session (e.g., by clicking on the provided hyperlink)), in response to a determination that a predefined length of time has elapsed since the last receipt of location information/data (e.g., 1 second, 30 seconds, 1 minute, and/or the like), in response to receipt of information/data that one or more shipments/items contained within the vehicle 100 have been delivered, and/or the like. Accordingly, the location of the vehicle 100 (and consequently the location of shipments/items contained within the vehicle 100) may be monitored at least periodically as the vehicle 100 traverses an assigned vehicle route such that updating the shipment/item tracking session may include updating the shipment/item tracking session continuously, updating the shipment/item tracking session at least once during a first time period, wherein the first time period comprises a range of one minutes to five minutes, or updating the shipment/item tracking session at least once during a second time period, wherein the second time period comprises a range of five minutes to fifteen minutes.

With reference to block 506 of FIG. 5A, the carrier computing entity 110 updates the shipment/item information/data item and the shipment/item tracking session to indicate the current location of the shipment/item is the updated location of the vehicle. As noted above, the location of the vehicle 100 may be received in response to one or more trigger events, and thus the location of the shipment/item, as reflected in the shipment/item tracking session, may be updated upon receipt of updated vehicle 100 location information/data. Moreover, as mentioned previously, the location of the shipment/item as reflected in the shipment/item tracking session may be based on a location of the shipment/item as reflected in the shipment/item information/data for the shipment/item. Accordingly, the carrier computing entity 110 (or another computing entity) may update the shipment/item information/data for the shipment/item upon receipt of updated location information/data for the shipment/item. The shipment/item tracking session may then be updated to reflect the location of the shipment/item as stored in the shipment/item data.

Figure 5E:
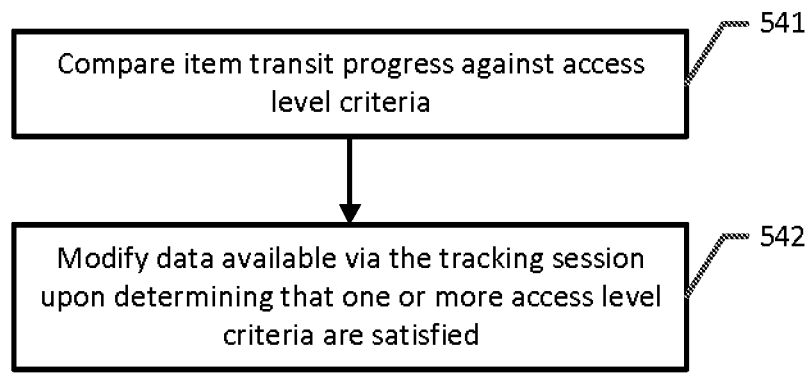

As previously mentioned, the amount of information/data that may be provided via the shipment/item tracking session may vary based on a determination of whether a particular shipment/item satisfies one or more access level criteria, as indicated at blocks 541-542 of FIG. 5E. For example, the amount of information/data provided to the shipment/item recipient/user may vary over time, such that a shipment/item recipient/user may receive increasingly more information/data as the shipment/item gets closer to its final delivery location (e.g., an inverse relationship). As specific examples, the levels of information/data may comprise (1) a first access level providing a simple estimated delivery window (e.g., Delivery is expected between 4:00 PM and 8:00 PM today), (2) a second access level providing a map showing an imprecise location of a delivery vehicle 100 (e.g., represented by an enlarged polygon shown covering a region of a map display) and/or a narrowed expected delivery window (e.g., Delivery is expected between 5:00 PM and 7:00 PM), and/or (3) a third access level providing a map showing a precise location of a delivery vehicle 100 (e.g., indicated by an icon displayed on a map) and/or an estimated delivery time (e.g., Delivery is expected at 5:06 PM). In one embodiment, the location of the vehicle 100 (and shipment/item) is displayed via an inverse relationship with regard to the time from delivery. For instance, the further the time from delivery, the larger the icon or less imprecise the location information/data for the vehicle 100 is provided for display. The closer the time to delivery, the more precise the location information/data for the vehicle 100 is provided for display.

Figure 8A:
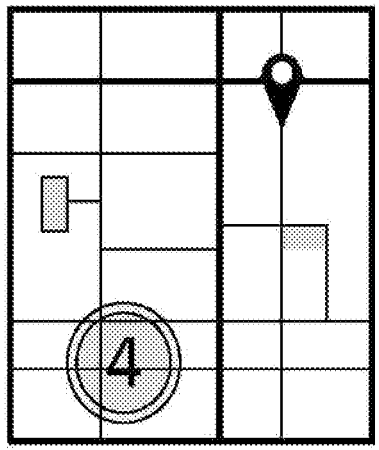
Figure 8B:
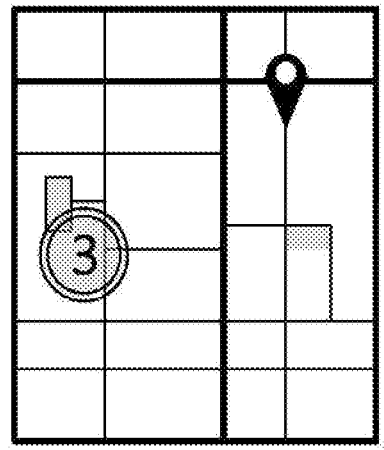
Figure 8C:
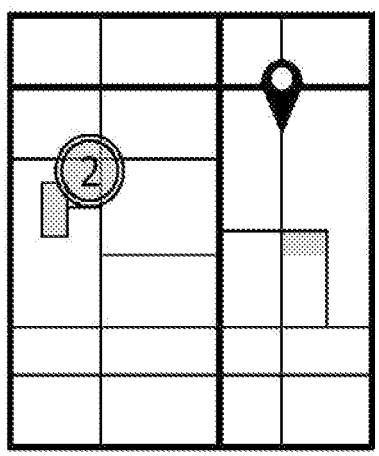

As another example, once the vehicle 100 is within a specified distance, time, and/or number of deliveries of delivering the shipment/item to the recipient/user, the recipient/user is given access to additional information/data showing the vehicle's 100 estimated location on a map. Simultaneously, the estimated delivery window may be narrowed, based on the current location of the delivery vehicle 100 (e.g., the estimated delivery window may begin by indicating that the shipment/item is scheduled for delivery on a particular day, and then may be narrowed to indicate that it is scheduled to be delivered between 5:00 PM and 6:30 PM on that day). The estimated location may be imprecise (e.g., the estimate encompasses a geographic region including several streets), as shown in FIGS. 8B and 8C, in order to provide only an estimate of the vehicle's 100 current location without disclosing the precise current location of the vehicle 100. In various embodiments, this level of detail regarding a vehicle's 100 current location may be shared beginning at the start of the delivery day.

In various embodiments, the access level criteria may be predefined based on a distance between the current location of the shipment/item and its intended destination. For example, a computing entity (e.g., carrier computing entity 110) may generate one or more geofences around a destination location for a shipment/item. The geofences may be defined based on a distance threshold associated with each of one or more access level criteria, such that the computing entity may determine whether the shipment/item is within a predefined threshold distance of the destination location in order to determine the appropriate amount of information/data to be provided via the shipment/item tracking session. For example, upon determining that the shipment/item is outside of one or more geofences, a first access level may be provided via the shipment/item tracking session, upon determining that the shipment/item is within a first geofence but outside of a second geofence, a second access level may be provided via the shipment/item tracking session, and upon determining that the shipment/item is within both the first geofence and the second geofence, a third access level may be provided via the shipment/item tracking session. In various embodiments in which a plurality of geofences are provided around a destination location, the plurality of geofences may be nested, such that one or more geofences are entirely within one or more other geofences. For example, a plurality of nested geofences may be defined as concentric circles around the destination location, such as a first geofence having a first radius extending away from the destination location, and a second geofence having a second, smaller radius extending away from the destination location. As a further example, the current location of the shipment/item may be determined based on the location of a vehicle 100 in a geofenced area, as discussed in U.S. Pat. No. 9,222,781, the entirety of which is incorporated herein by reference.

In certain embodiments, the access level criteria may comprise time-based access level criteria, such that the amount of information/data shared with a shipment/item recipient/user is varied based on the estimated time remaining before delivery. For example, the access level criteria may comprise one or more estimated time until delivery thresholds that may be utilized to determine an amount of information/data to be provided via the shipment/item tracking session. For example, a first access level may be provided via the shipment/item tracking session upon a determination that the shipment/item is more than a threshold amount of time away from being delivered; a second access level may be provided via the shipment/item tracking session upon a determination that the shipment/item is less than a first threshold time away from being delivered but more than a second threshold amount of time away from being delivered; and a third access level may be provided via the shipment/item tracking session upon a determination that the shipment/item is less than the first threshold time and the second threshold time away from being delivered.

In yet other embodiments, the shipment/item access criteria may comprise a delivery sequence-based criteria, such that the amount of information/data shared with a shipment/item recipient/user is varied based on the number of delivery stops remaining before a delivery stop corresponding to the shipment/item. For example, a first access level may be provided via the shipment/item tracking session upon a determination that the shipment/item is more than a threshold number of deliveries away from being delivered; a second access level may be provided via the shipment/item tracking session upon a determination that the shipment/item is less than a first threshold number of deliveries away from being delivered but more than a second threshold number of deliveries away from being delivered; and a third access level may be provided via the shipment/item tracking session upon a determination that the shipment/item is less than the first threshold number of deliveries and the second threshold number of deliveries away from being delivered. As a further example, the shipment/item access criteria of the shipment/item may be determined based on the delivery sequence-based criteria, as discussed in U.S. patent application Ser. No. 14/335,471, the entirety of which is incorporated herein by reference.

Various embodiments utilize different combinations of these item access criteria, such that any given embodiment may use a possibly unique combination of distance-based, time-based, and/or delivery sequence based item access criteria.

FIG. 5B provides another example process where the shipment/item tracking session identifies the current location of the shipment/item by generating renderable map information/data identifying the current location of the item. As shown in block 511 the carrier computing entity 110, may determine multiple access views of the renderable map data, wherein the multiple views comprise at least a wide view of the renderable map information/data associated with a first range of locations of the delivery vehicle (such as the view shown in FIG. 8A), the first range of locations may be while the delivery vehicle is far away from the delivery location thus showing a large or wide area such as a city level view.

The multiple views may also include a second view, such as a moderate view of the renderable map information/data associated with a second range of locations of the delivery vehicle (such as the view shown in FIGS. 8B and 8C). The second range of locations may be while the delivery vehicle is closer but still some distance away from the delivery location. For example, the delivery vehicle may be halfway through the deliveries before the shipment/item being tracked. The second/moderate view will be zoomed in more than the wide view, for example it may show several neighborhoods or part of a city.

Figure 8D:
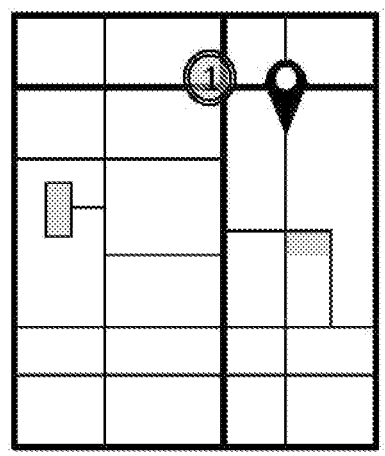

The multiple views may also include a third view, such as a close or zoomed in view of the renderable map information/data associated with a third range of locations of the delivery vehicle (such as the view shown in FIGS. 8D). The third/close view may be zoomed in and associated with a range of locations that indicate the shipment/item will be delivered soon. The third/close view will be zoomed in more than the moderate view, for example the close view may show a neighborhood or a few blocks around the delivery location.

As shown in block 512, the carrier computing entity 110 then determines that the delivery vehicle is within the second range of locations using any of the location determination methods described above.

As shown in block 513, the carrier computing entity 110 provides the renderable map information/data corresponding to the moderate view of the map to the one or more users in response to determining that the delivery vehicle is within the second range of location.

As shown in block 514, the carrier computing entity 110 determines that the delivery vehicle is within the third range of locations.

As shown in block 515, the carrier computing entity 110 provides the renderable map information/data corresponding to the close view of the map to the one or more users in response to determining that the delivery vehicle is within the third range of location.

Figure 6A:
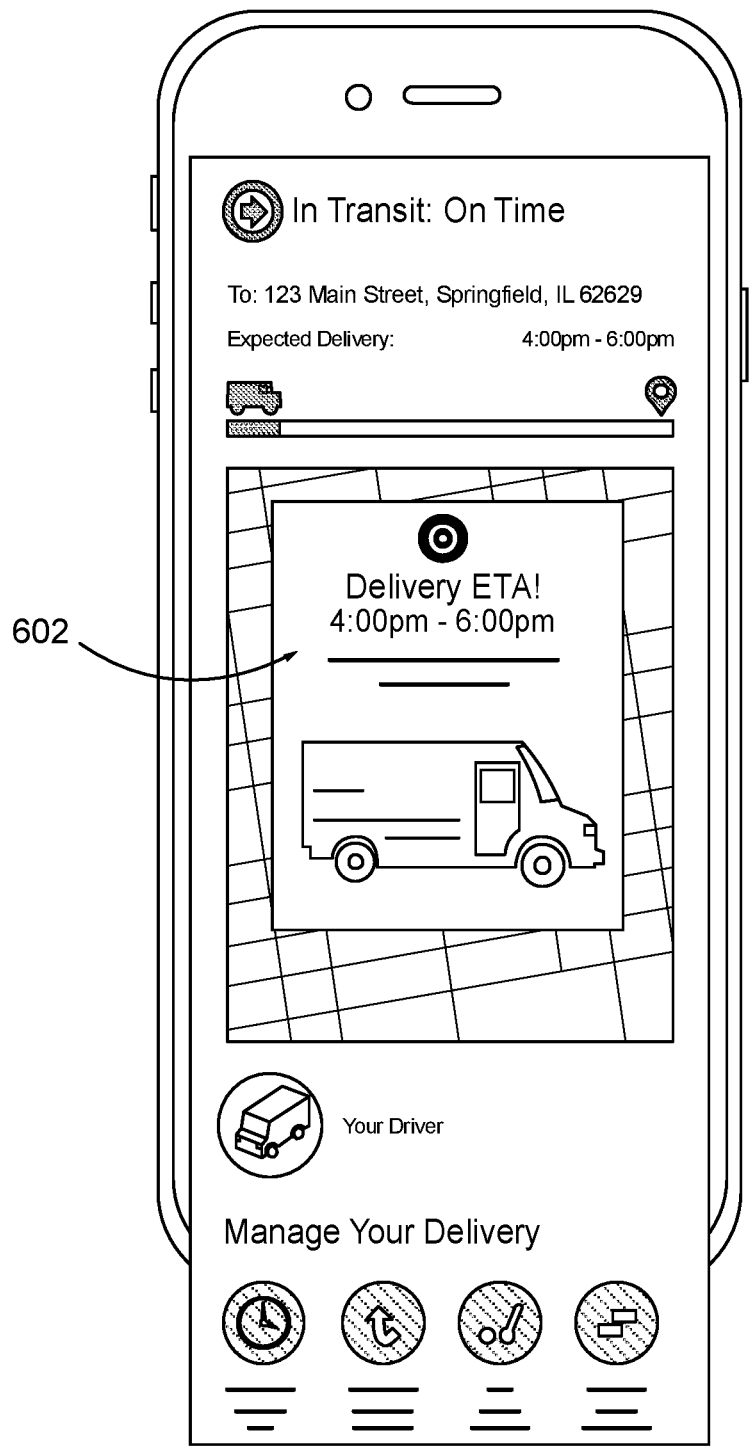
FIGS. 6A-10 are example graphical user interface mockups illustrating information/data that may be presented to a user, in accordance with certain embodiments of the present invention.

With reference to FIG. 6A, a first access level may be provided for all shipments/items that do not satisfy any access level criteria. According to the first access level, the webpage associated with a shipment/item tracking session may not include information/data about the current location of the shipment/item, and the webpage may instead provide an estimated window when the shipment/item recipient/user can expect to receive the shipment/item (e.g., Delivery expected between 4:00 PM and 8:00 PM), as shown in FIG. 6A.

Figure 6B:

In another example, embodiment, with reference to FIG. 6B, a generic access level may be provided for all shipments/items that may be delivered during a specific time period (e.g. deliveries scheduled for that entire day) without regards to a determined access level criteria. According to the generic access level, the webpage associated with a shipment/item tracking session may not automatically include information/data about the current location of the shipment/item, and the webpage may instead provide information/data and options regarding the shipment/item such as a change delivery option 614, a view delivery planner option 616, or follow my delivery option 612. In the instance that a recipient/user selects the follow my delivery option 612, the amount of information/data subsequently provided by the webpage may increase based on the current location of the shipment/item, as described previously.

Figure 7A:
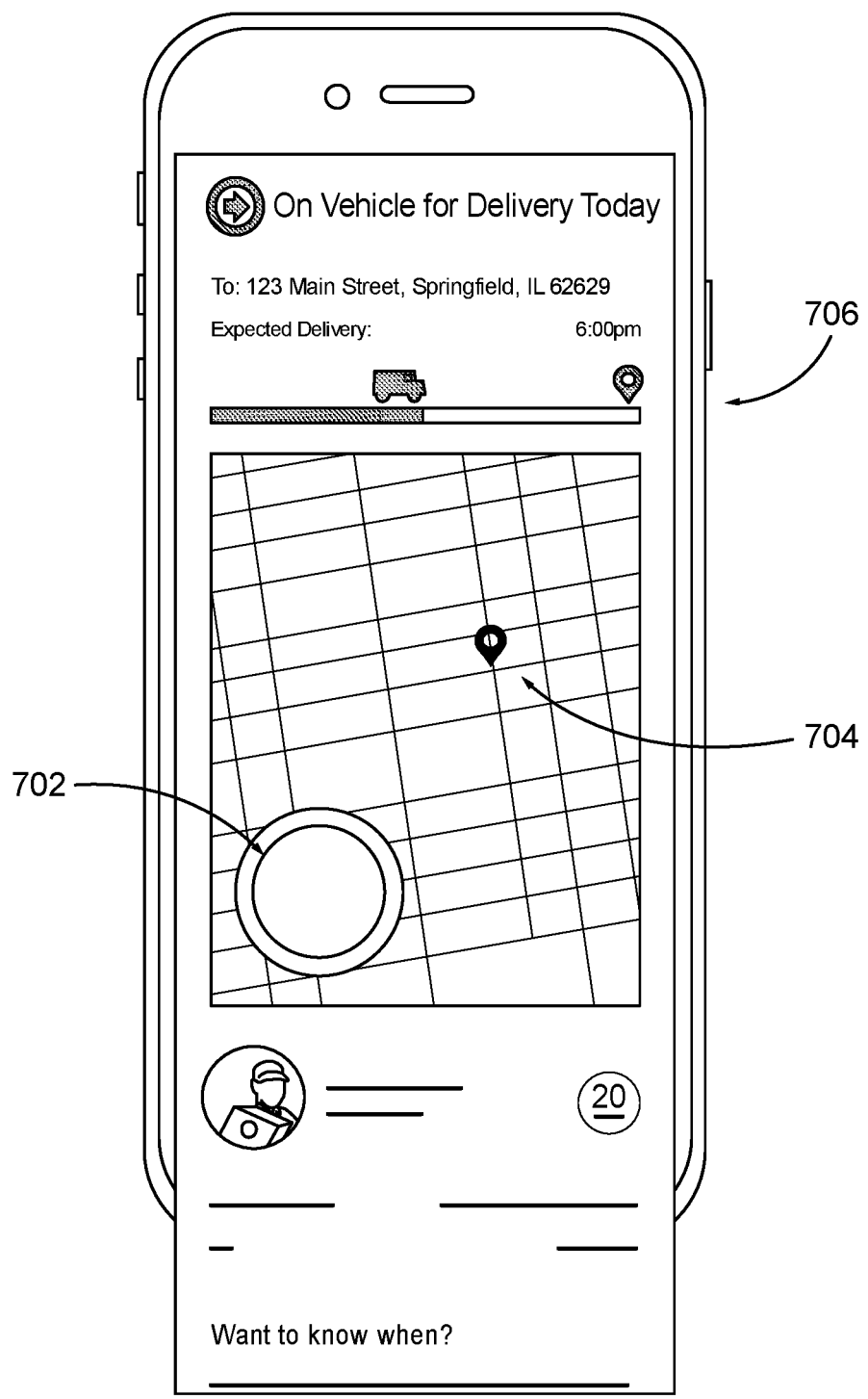

In various embodiments, the amount of information/data provided via the webpage associated with the shipment/item tracking session may increase upon a determination that the shipment/item satisfies a first access level criteria. As mentioned, the access level criteria may comprise a distance-based access level criteria, a time-based access level criteria, and/or a delivery sequence based access level criteria. Upon a determination that the shipment/item satisfies a first access level criteria, a second access level may be provided via the webpage associated with the shipment/item tracking session. For example, the second access level may cause the webpage associated with the shipment/item tracking session to be populated with a map illustrating an estimated location-region corresponding to the location of the shipment/item. The location-region is oversized, potentially covering several adjacent streets, such that the precise location of the shipment/item (and the carrying vehicle 100) is not disclosed. Moreover, in various embodiments, the location-region may include one or more symbols, alphanumeric characters, and/or the like. An example screenshot/mockup showing information/data provided according to the second access permission is shown in FIG. 7A. In the screenshot/mockup of FIG. 7A, the delivery vehicle 100 is located somewhere within the location-region 702 identified as the carrier branded concentric circles. The delivery location is marked by the dropdown pin 704. The progress of the delivery is also shown in progress bar 706. An example screenshot/mockup showing information/data provided according to the second access permission is shown in FIG. 7A.

Figure 7B:
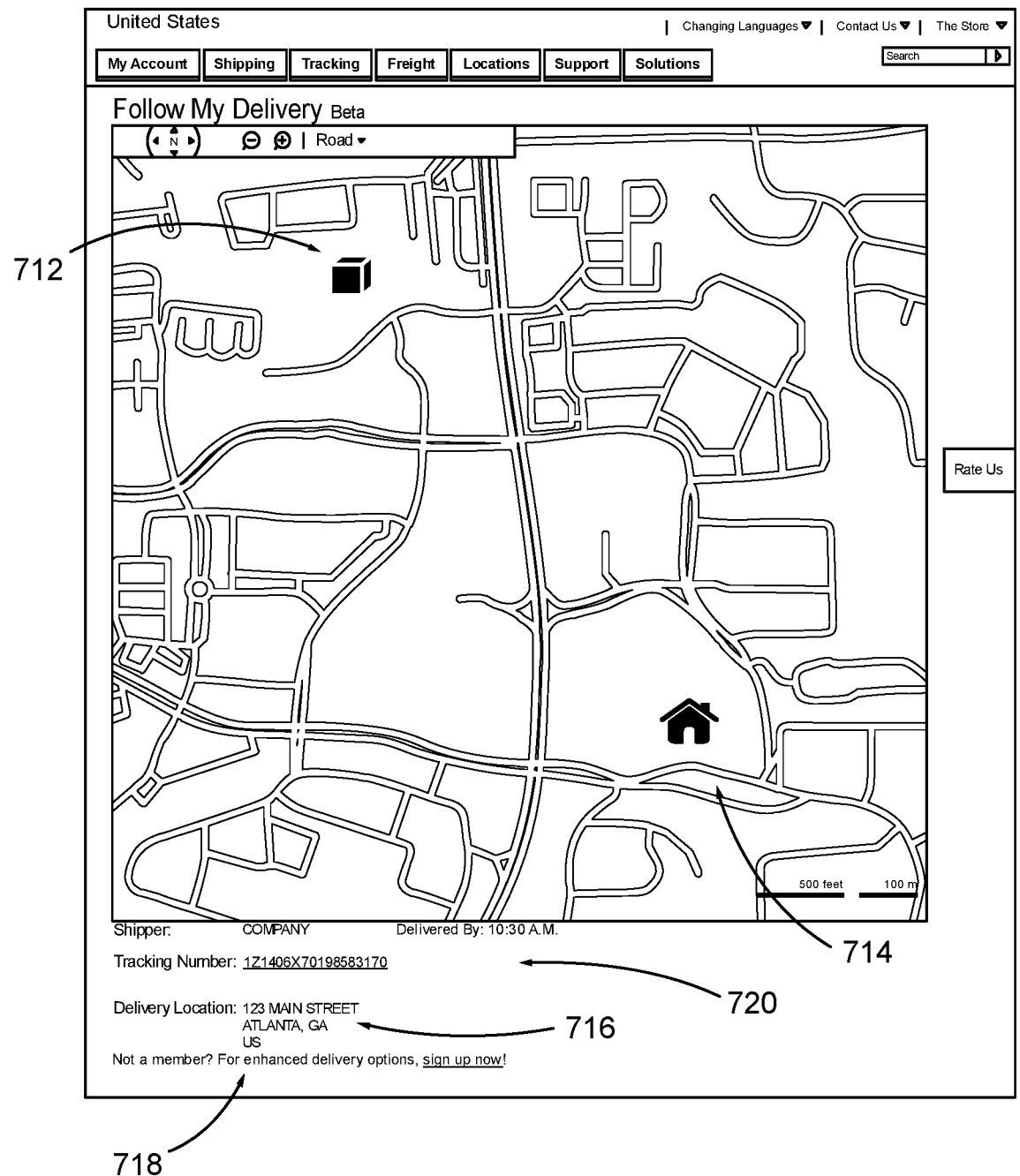

Another example screenshot/mockup showing information/data provided according to generic access permission is shown in FIG. 7B following the example shown in 6B wherein a recipient/user selected the follow my delivery option. In the screenshot/mockup of FIG. 7B, the delivery vehicle 100 corresponds to the location 712 (identified as the "UPS" parcel). The delivery location is marked by the house symbol 714. In the screenshot/mockup of FIG. 7B, also includes other shipment/item information/data provided to the recipient/user such as a tracking number 716, the delivery location address 718, and estimated delivery time 720.

In various embodiments, the location-region may be generated based on the current location of the delivery vehicle 100 and various predefined parameters for defining the location-region. The predefined parameters may comprise a random and/or pseudo random algorithm for generating and/or placing the location-region on a map display relative to the actual location of the delivery vehicle 100. Because the location-region is configured to mask the actual location of the delivery vehicle 100, the actual location of the delivery vehicle 100 should not be directly predictable from the placement of the location-region on a map display. Accordingly, the placement location of the location-region on a generated map display may be randomly generated such that the actual location of the delivery-vehicle 100 is somewhere within the map area covered by the location-region.

The size and/or placement of the location-region may be generated based on the street density surrounding the area in which the delivery vehicle 100 is located. For example, in a dense urban neighborhood, several streets may be located within a small geographic area, and accordingly a relatively small location-region may be sufficient to mask the actual location of the delivery vehicle 100. However, in a rural region, only a small number of roadways (e.g., only one roadway) may be located within a small geographical region, and accordingly a small location-region may still be indicative of an actual location of a delivery vehicle 100. Accordingly, the size of the location-region may be generated to encompass a plurality of roadways (e.g., a threshold number of alternative roadways) to mask the actual location of the delivery vehicle 100. As a non-limiting example, the size of the location-region may be selected to encompass at least 5 roadways. Accordingly, a location-region within a dense urban area may be smaller than a location-region within a more sparsely populated rural area.

Moreover, in various embodiments, a computing entity (e.g., carrier computing entity 110) may be configured to modify one or more characteristics of the location-region indicated on the map display of the shipment/item tracking session based on various criteria. For example, the size, shape, appearance, location, and/or the like of the location-region displayed on the map display may change as delivery of a shipment/item becomes more imminent (e.g., the distance between the shipment/item and the destination location shrinks, the estimated time remaining until delivery decreases (e.g., determined based on a comparison between the current time and an estimated time of delivery), and/or the number of deliveries remaining before delivery of the shipment/item decreases). As a specific example, the size of the location-region may decrease to provide an increasing level of precision regarding the current location of the shipment/item as delivery becomes more imminent. As yet another example, the color and/or symbols contained within the displayed location-region may change as delivery becomes more imminent. As just one specific example, the displayed location-region may contain decreasing numbers as delivery becomes more imminent (e.g., 5, 4, 3, 2, 1).

In various embodiments, the one or more characteristics of the location-region may change continuously as delivery of the shipment/item becomes more imminent. For example, the size of the displayed location-region may continuously decrease as delivery becomes more imminent. In other embodiments, the one or more characteristics of the location-region may change in a "lock-step" fashion, for example, after determining that the shipment/item satisfies one or more additional location-region change criteria. Like the access level criteria, the location-region change criteria may be location based (e.g., based on various distance thresholds between the shipment/item and the destination location, time based (e.g., based on various time thresholds indicative of the estimated amount of time remaining before delivery at the destination location), and/or delivery sequence based (e.g., based on various threshold numbers of deliveries before delivery at the destination location). Accordingly, the characteristics of the location-region may change each time the shipment/item satisfies an additional location-region change criteria (e.g., the size of the location-region may decrease each time an additional location-region change criteria is satisfied). Example screenshot/mockups showing a changing location-region are shown in FIGS. 8A-8D. As shown in FIGS. 8A-8D, the size of the location-region may decrease as the shipment/item moves closer to the delivery destination, and the location-region may comprise a decreasing number as the location of the shipment/item moves closer to the delivery destination.

In various embodiments, upon a determination that the shipment/item satisfies both the first access level criteria and a second access level criteria, a third access level criteria may be provided via the webpage associated with the shipment/item tracking session. For example, with the third access permission, the webpage is populated with a map illustrating a precise location of the vehicle 100 containing the shipment/item (the map may include an icon indicating the location of the vehicle 100). The map may additionally illustrates the route to be taken between the current location of the delivery vehicle 100 and the destination location, for example, as determined based on the assigned vehicle route. An example screenshot/mockup showing information/data provided according to the third access permission is shown as FIG. 9A.

Alternatively, FIGS. 9B and 9C are example screenshots/mockups showing a generic access level including For example, once the delivery vehicle 100 is within a smaller distance, shorter time, or small number of stops before delivering the shipment/item (e.g., within 1 mile, within 15 minutes, and/or within 3 delivery stops), the recipient/user is granted access to more precise information/data about the vehicle's 100 current location. This may include a precise location of the vehicle 100, as well as the scheduled route to be traveled by the vehicle 100 between the current location of the vehicle 100 and the final delivery location for the recipient/user's shipment/item. The estimated delivery window may be further narrowed to provide an estimated delivery time of the package (e.g., Your package will arrive at 5:48 PM).

Figure 5F:
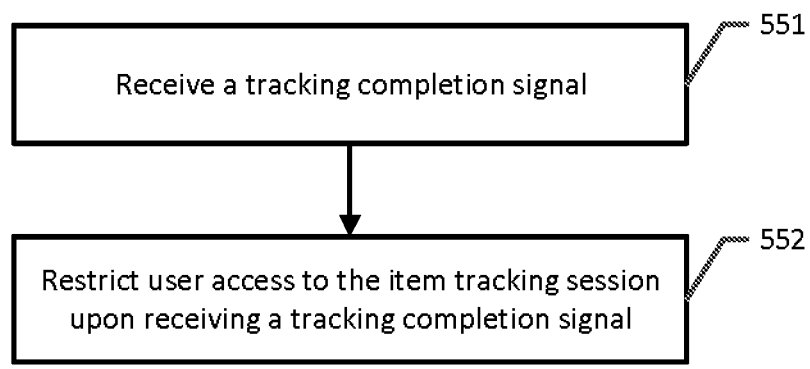

With reference to FIG. 5F, the carrier computing entity 110 receives a tracking completion signal, as shown in block 551. In some examples, the computing entity 110 receives information/data indicating that a shipment/item has been delivered. For example, the information/data indicating that a shipment/item has been delivered may be received from a mobile computing entity 105 carried by an operator of the vehicle 100 carrying the shipment/item. As a specific example, upon delivery of the shipment/item to the destination location, the operator of the vehicle 100 may utilize the mobile computing entity 105 to scan the shipment/item indicia on the shipment/item being delivered. The mobile computing entity 105 may thereafter transmit information/data indicating the scanned shipment/item has been delivered to the destination location. In some further examples, receiving a tracking completion signal may comprises receiving one or more of a delivery completed notification, a delivery not completed notification, a tracking error notification, or a tracking time out notification.

Upon receipt of information/data indicating a shipment/item has been delivered, in various embodiments the carrier computing entity 110 may terminate the shipment/item tracking session and/or restrict user access to the shipment/item tracking session upon receiving a tracking completion signal, as indicated at block 552. For example, the carrier computing entity 110 may deactivate the shipment/item tracking session identifier and/or the hyperlink provided to the shipment/item recipient/user, such that the webpage associated with the shipment/item tracking identifier is no longer accessible. Alternatively, the carrier computing entity 110 may redirect the hyperlink to a second webpage (or other interface) containing alternative content. For example, the second webpage may request the user to provide feedback regarding his/her item delivery experience.

Figure 10:
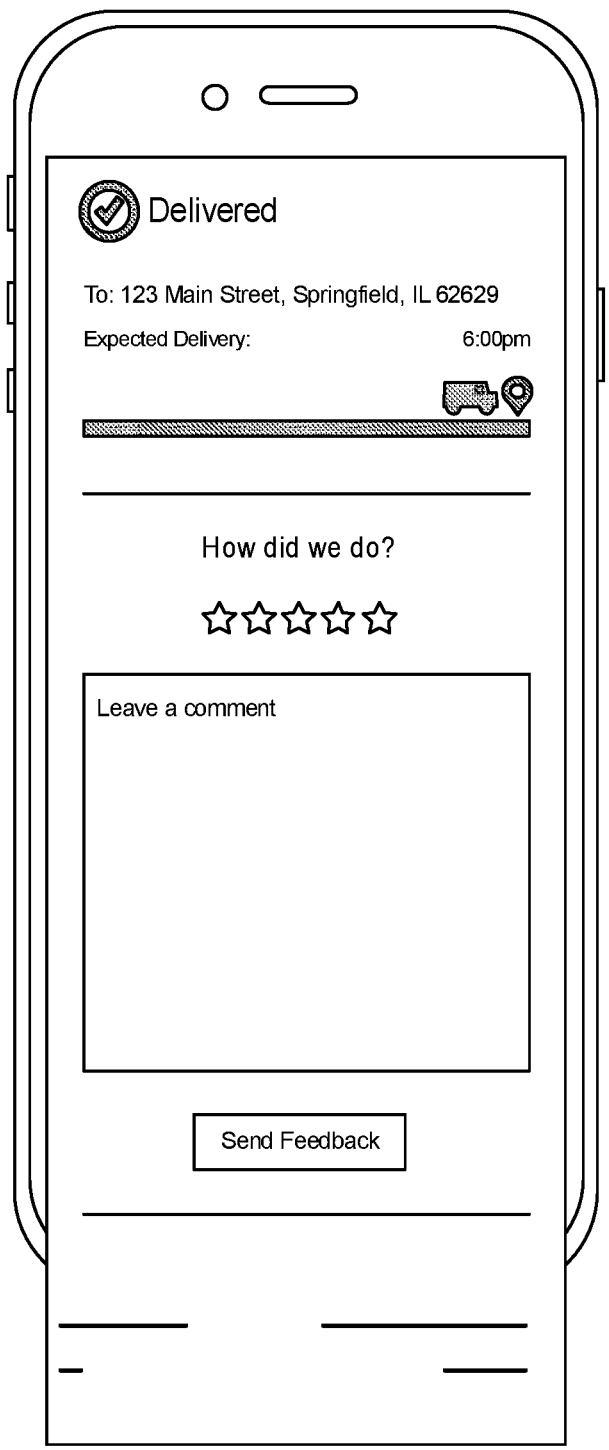

Accordingly, once a shipment/item has been delivered, the shipment/item recipient/user is no longer provided access to view the location of the delivery vehicle 100. The webpage providing tracking information/data may indicate the package has been delivered and/or may include a request for feedback about the delivery process. FIG. 10 is a screenshot/mockup showing an example display after a package has been delivered.

In some examples, once the shipment/item is delivered (or the vehicle 100 reaches the delivery location, regardless of whether delivery was successful), the recipient/user's access to the vehicle's 100 current location is terminated, such that the recipient/user is no longer enabled to view the vehicle's 100 location.

In various embodiments, the computing entity (e.g., the carrier computing entity 110) may terminate the shipment/item tracking session after an unsuccessful delivery attempt. For example, if a delivery vehicle operator attempts to deliver a shipment/item, but is unable to complete the delivery (e.g., because the recipient/user was not available to provide a required signature confirmation, because the recipient/user was not available to pay additional fees due, and/or the like), the computing entity may terminate the shipment/item tracking session, such that the recipient/user is unable to view the location of the vehicle 100 containing the shipment/item after the unsuccessful delivery attempt.

In various embodiments, the computing entity (e.g., the carrier computing entity 110) may terminate the shipment/item tracking session after a delivery exception such as a delay in the delivery system. For example, if a delivery vehicle 100 will not be able to complete all of the deliveries during a delivery time period (e.g. before 9 pm) the computing entity may terminate the shipment/item tracking session, such that the recipient/user is unable to view the location of the vehicle 100 containing the shipment/item after the delivery exception.

As indicated, the access level criteria and/or a determination to terminate a shipment/item tracking session is made individually for each shipment/item on a vehicle 100. Accordingly, while a first shipment/item may have already been delivered by a delivery vehicle 100 and the associated shipment/item tracking session may have been terminated, a second shipment/item on the delivery vehicle 100 may be associated with the first access level, and a third shipment/item on the delivery vehicle 100 may be associated with a second access level.

A concise example process flow between initiation of a communication to a shipment/item recipient/user and ultimate delivery of a shipment/item to the shipment/item recipient/user is as follows:

In the morning of a delivery day for a shipment/item, the recipient/user is given an estimated delivery window encompassing a period of time during which delivery of the package is expected (e.g., the recipient/user may receive the message "Your package is scheduled to be delivered between 4:00 PM and 8:00 PM."). This estimated delivery window may be based on the vehicle operator's assigned vehicle route for that day.

Once the vehicle 100 is within a specified distance, time, and/or number of deliveries of delivering the shipment/item to the recipient/user, the recipient/user is given access to additional information/data showing the vehicle's 100 estimated location on a map. Simultaneously, the estimated delivery window may be narrowed, based on the current location of the delivery vehicle 100 (e.g., the recipient/user may receive the message "Your package is scheduled to be delivered between 5:00 PM and 6:30 PM."). The estimated location may be imprecise (e.g., the estimate encompasses a geographic region encompassing several streets) in order to provide only an estimate of the vehicle's 100 current location without disclosing the precise current location of the vehicle 100. In various embodiments, this level of detail regarding a vehicle's 100 current location may be shared beginning at the start of the delivery day.

Once the delivery vehicle 100 is within a smaller distance, shorter time, or small number of stops before delivering the shipment/item (e.g., within 1 mile, within 15 minutes, and/or within 3 delivery stops), the recipient/user is granted access to more precise information/data about the vehicle's 100 current location. This may include a precise location of the vehicle 100, as well as the scheduled route to be traveled by the vehicle 100 between the current location of the vehicle 100 and the final delivery location for the recipient/user's shipment/item. The estimated delivery window may be further narrowed to provide an estimated delivery time of the package (e.g., Your package will arrive at 5:48 PM.").

Once the shipment/item is delivered (or the vehicle 100 reaches the delivery location, regardless of whether delivery was successful), the recipient/user's access to the vehicle's 100 current location is terminated, such that the recipient/user is no longer enabled to view the vehicle's 100 location.

Figure 5G:
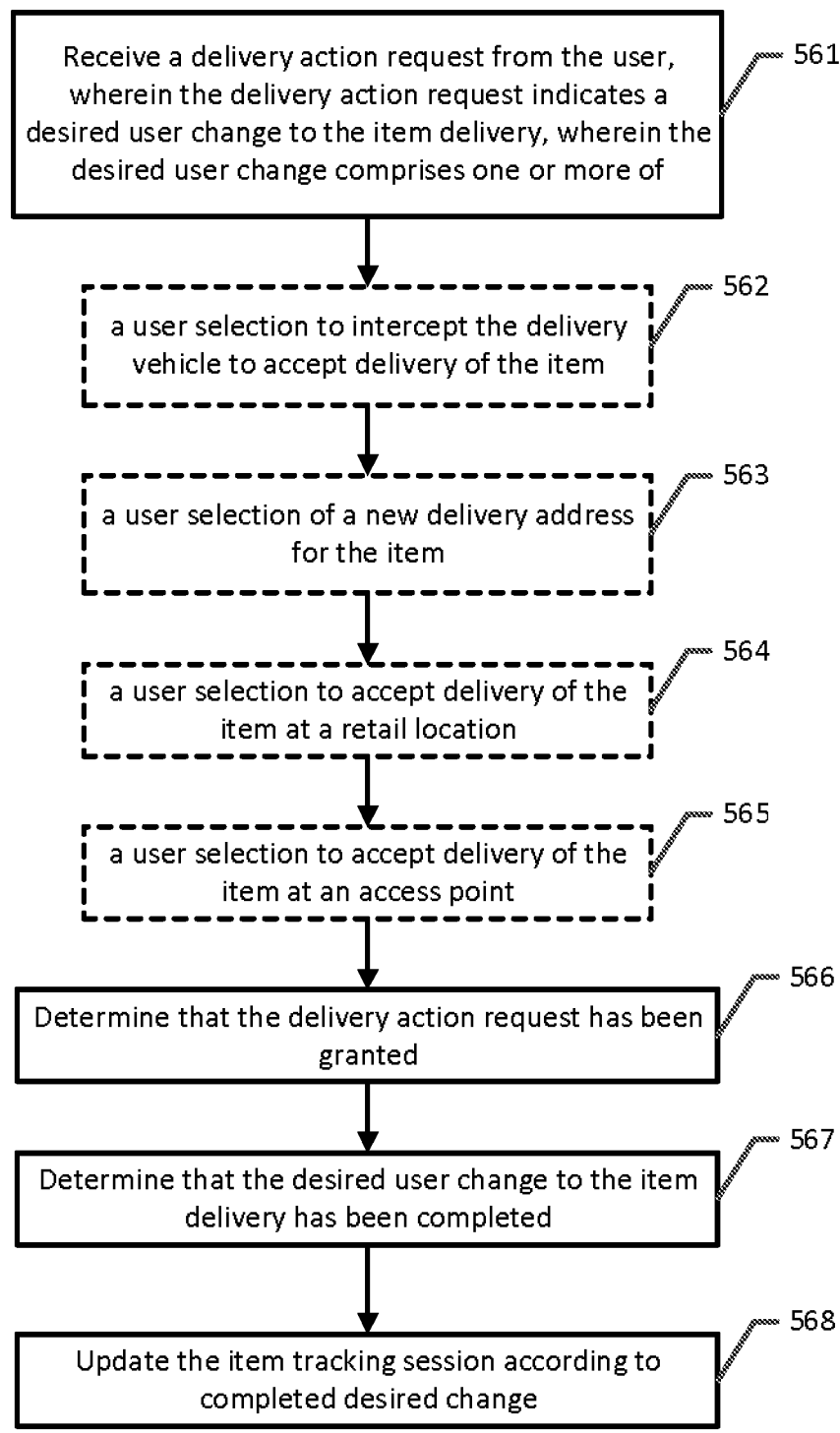

In some examples, a shipment/item recipient/user may desire to change aspects of the delivery during the shipment/item tracking session. For example, a shipment/item recipient/user may decide from the information/data provided in the shipment/item tracking session to action the shipment/item or change when or how the shipment/item is delivered. FIG. 5G illustrates a flowchart of additional steps performed for a user to request a delivery action. Beginning with block 561, the carrier computing entity 110 receives a delivery action request from the user.

As shown in blocks 562-565, the desired user change may comprises one or more of a user selection to intercept the delivery vehicle to accept delivery of the item, a user selection of a new delivery address for the item, a user selection to accept delivery of the shipment/item at a retail location, or a user selection to accept delivery of the shipment/item at an access point.

As shown in block 566, the carrier computing entity may then determine that the delivery action request has been granted.

As shown in block 567, the carrier computing entity may then determine that the desired user change to the shipment/item delivery has been completed. For example, if a user request to intercept the delivery vehicle is granted and the user has successfully received the package from the delivery vehicle 100, the computing entity may determine that the desired user change is completed.

As shown in block 568, the carrier computing entity may then update the shipment/item tracking session according to completed desired change. For example, if the user has received the package, the shipment/item tracking session will reflect that the package is delivered as described above.

b. Exemplary User Computing Entity Operation

As mentioned, various embodiments provide a shipment/item recipient/user with information/data regarding the current location of a shipment/item prior to delivery of the shipment/item to an intended destination. In some examples, the information/data is provided to a user utilizing a user device such as user computing entity 117. Thus various methods are described herein to show. In various embodiments, the location of the shipment/item is provided to a user through a user interface which may be an application, browser, user interface, dashboard, webpage, and/or other similar service which may be accessed on a user device. The user interface may be embodied as shown in FIGS. 6A-10 and described above.

Figure 11A:
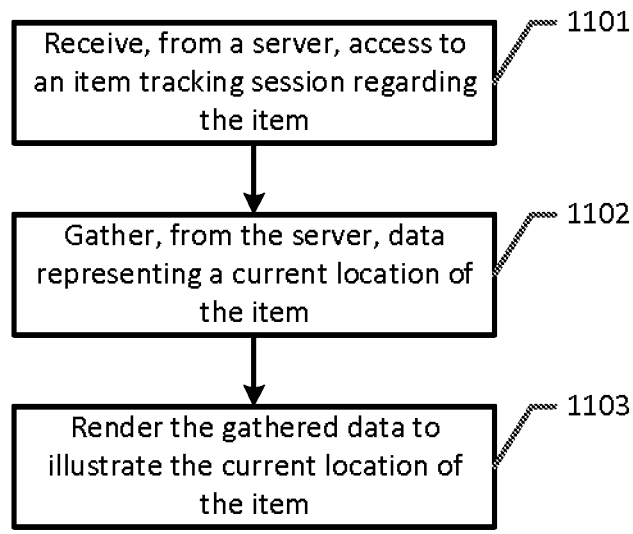
FIG. 11A is a flowchart illustrating operations and processes that can be used in performing various embodiments of the present invention.

FIG. 11A illustrates a flowchart of steps performed for providing information/data indicative of the current location of a shipment/item to a shipment/item recipient/user. Beginning with block 1101, the user computing entity 117 receives, from a carrier computing entity 110 (server), access to a shipment/item tracking session regarding the item. This may include receiving a map available notification from the carrier computing entity 110, wherein the map available notification comprises a map access link. In some examples, the map available notification is received as one or more of an email, a short message service, or a notification in a user delivery profile.

As shown in block 1102, the user computing entity may then gather, from the carrier computing entity 110, information/data representing a current location of the item. In some examples, the gathered information/data comprises map information/data identifying the current location of the item. In another embodiment, the gathered information/data may be information/data received from a shipment/item tracking session. In some examples, the gathered information/data may additionally or alternatively include audio information such that the user computing entity may audibly indicate the location of the shipment/item. For example, the gathered information/data may include audio information which audibly indicates the location in transit of the shipment/item, an estimated time of arrival of the shipment item, and/or any of the other information that may be visually provided by a map in a mapping application. In some embodiments, the audio information may include descriptive information which audibly describes an approximate distance (e.g., in miles or kilometers), an expected route of travel to the destination from the location in transit of the shipment/item, traffic along the expected route, or the like.

As shown in block 1103, the user computing entity may then render the gathered information/data to illustrate the current location of the item. In some examples rendering the gathered information/data comprises rendering the map information/data to provide a map with a wide view of the location of the item.

In some examples, the user computing entity may be configured to receive information/data representing the location of the shipment/item and rendering the received information/data continuously, receive information/data representing the location of the shipment/item and rendering the received information/data at least once during a first time period, wherein the first time period comprises a range of one minutes to five minutes, or receive information/data representing the location of the shipment/item and rendering the received information/data at least once during a second time period, wherein the second time period comprises a range of five minutes to fifteen minutes.

Figure 11B:
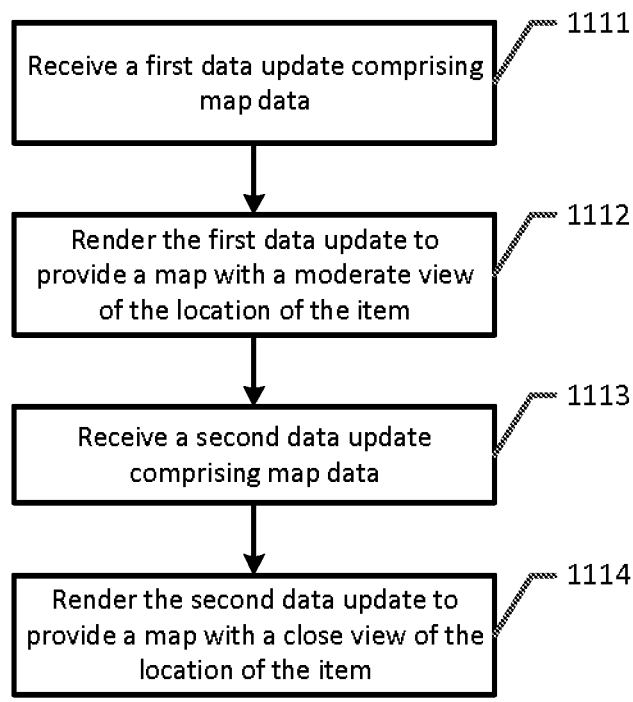
FIGS. 11B-11C are flowcharts illustrating additional operations and processes that can be used in performing various embodiments of the present invention.

FIG. 11B illustrates a flowchart of additional steps performed for providing information/data indicative of the current location of a shipment/item to a shipment/item recipient/user. Beginning with block 1111, the user computing entity 117 receives a first information/data update comprising map data.

As shown in block 1112, the user computing entity may then render the first information/data update to provide a map with a moderate view of the location of the item.

As shown in block 1113, the user computing entity 117 may then receive a second information/data update comprising map data.

As shown in block 1114, the user computing entity may then render the second information/data update to provide a map with a close view of the location of the item. In one embodiment, the map information/data comprises a first icon, the first information/data update comprises a second icon, and the second information/data update comprises a third icon. The first icon may then be rendered in a first size on the map with a wide view of the location of the item. The second icon second icon may be rendered in a second size on the map with a moderate view of the location of the item, where the second size provides a more specific location than the first size. The third icon may be rendered in a third size on the map with a close view of the location of the item, wherein the third size provides a more specific location than the second size.

Figure 11C:
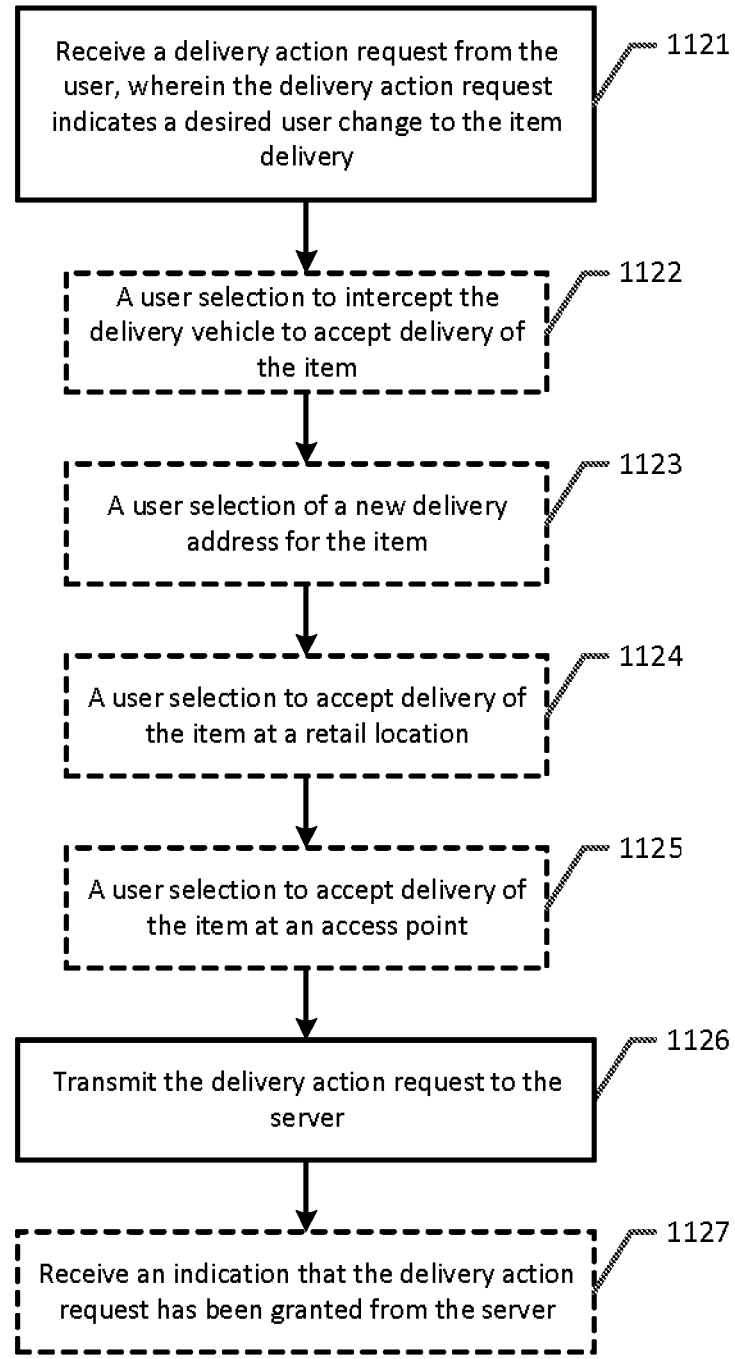

FIG. 11C illustrates a flowchart of additional steps performed for interacting with a shipment/item recipient/user. Beginning with block 1121, the user computing entity 117 receives a delivery action request from the user, wherein the delivery action request indicates a desired user change to the shipment/item delivery As shown in blocks 1122-1125, the desired user change may comprise one or more of a user selection to intercept the delivery vehicle to accept delivery of the item, a user selection of a new delivery address for the item, a user selection to accept delivery of the shipment/item at a retail location, or a user selection to accept delivery of the shipment/item at an access point.

As shown in block 1126, the user computing entity may then transmit the delivery action request to the carrier computing entity 110.

As shown in block 1127, the user computing entity may then optionally receive an indication that the delivery action request has been granted from the carrier computing entity 110.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Although the above embodiments are described by associating the location of a vehicle 100 with the location of a shipment/item, in various embodiments, the location of a mobile computing entity 105 (e.g., carried by a delivery vehicle operator) is associated with the shipment/item, such that the location of the mobile computing entity 105 is used as a proxy for the location of the shipment/item.

Moreover, in various embodiments, various computing entities may be configured to only provide the shipment/item tracking session during a particular portion of a transportation between the origin and the destination for a shipment. For example, the shipment/item tracking session may be made available to shipment/item recipients (users) only during the "last leg" of the transportation process, during which the shipment/item will be delivered from a carrier facility to destination location. However, in various embodiments, the shipment/item tracking session may be made available during one or more portions of the transportation process. For example, the shipment/item tracking session may be initially generated when a carrier first receives a shipment/item (e.g., at a shipment/item origin) and the shipment/item tracking session may be provided to the recipient/user such that the recipient/user may track the location of the shipment/item during the entire transportation process until the shipment/item is delivered to the destination location.

The invention claimed is:

1. A method comprising:
    continuously receiving location information of a carrier vehicle from one or more location sensors associated with at least one of the carrier vehicle or a mobile computing device located within the carrier vehicle, wherein the location information of the carrier vehicle corresponds to a current location of an item;
    generating, by one or more computer processors, a graphical user interface, wherein the graphical user interface is configured to display a dynamic map and a dynamic icon generated using renderable map data, and the dynamic map and the dynamic icon identify the current location of the item based on the location information of the carrier vehicle; and
    automatically updating, by the one or more computer processors and based at least in part on the location information, display of the dynamic map and the dynamic icon via multiple access views to indicate the current location of the item as the carrier vehicle moves closer to a final delivery destination for the item by:
        determining the carrier vehicle is within a first range of locations;
        responsive to determining the carrier vehicle is within the first range of locations, rendering a wide view of the dynamic map and the dynamic icon in a first size on the graphical user interface;
        determining the carrier vehicle is within a second range of locations;
        responsive to determining the carrier vehicle is within the second range of locations, rendering a moderate view of the dynamic map and the dynamic icon in a second size on the graphical user interface; and
        determining the carrier vehicle is within a third range of locations; and
        responsive to determining the carrier vehicle is within the third range of locations, rendering a close view of the dynamic map and the dynamic icon in a third size on the graphical user interface.

2. The method of claim 1 further comprising:
    providing, by the one or more computer processors, access to the graphical user interface via a unique webpage associated with an item tracking session upon determining that one or more access level criteria for the item are satisfied.

3. The method of claim 2, wherein providing access to the graphical user interface associated with the item tracking session comprises:
    generating, by the one or more computer processors, a map available notification, wherein the map available notification comprises a map access link that can be used to access the graphical user interface; and causing, by the one or more computer processors, delivery of the map available notification to a user device.

4. The method of claim 3, wherein the map available notification is delivered to the user device using one or more of an email, a short message service, or a notification in a user delivery profile.

5. The method of claim 3, further comprising receiving, by the one or more computer processors, a tracking completion signal;
and terminating, by the one or more computer processors, access of the user device to the graphical user interface.

6. The method of claim 5, wherein receiving the tracking completion signal comprises receiving one or more of:
a delivery completed notification;
a delivery not completed notification;
a tracking error notification; or
a tracking time out notification.

7. The method of claim 1, wherein automatically updating display of the dynamic map and the dynamic icon to indicate the current location of the item further comprises at least one of:
updating display of the dynamic map and the dynamic icon continuously;
updating display of the dynamic map and the dynamic icon at least once during a first time period, wherein the first time period comprises a range of one minute to five minutes; or
updating display of the dynamic map and the dynamic icon at least once during a second time period, wherein the second time period comprises a range of five minutes to fifteen minutes.

8. The method of claim 1, further comprising: prior to the item arriving at the final delivery destination, receiving a change request from a user device, wherein the change request comprises one or more of:
a user selection to intercept the carrier vehicle to accept delivery of the item;
a user selection of a new delivery address for the item;
a user selection to accept delivery of the item at a retail location; or
a user selection to accept delivery of the item at an access point.

9. The method of claim 8, further comprising:
determining, by the one or more computer processors, that the change request has been completed; and
updating, by the one or more computer processors, an item tracking session associated with the item to reflect that the change request has been completed.

10. The method of claim 1, wherein the carrier vehicle comprises at least one of a manned terrestrial vehicle, an unmanned terrestrial vehicle, or an unmanned aerial vehicle.

11. An apparatus comprising at least one processor and at least one memory including program code, wherein the program code is configured to, when executed by the at least one processor, cause the apparatus to at least:
associate an item with a carrier vehicle by updating item data in a carrier database;
determine that an item tracking session availability trigger has occurred for the item;
determine a current location of the item based on a current location of the carrier vehicle;
generate a unique webpage associated with the item tracking session wherein the unique webpage is configured to display a dynamic map and a dynamic icon generated using renderable map data, and the dynamic map and the dynamic icon identify the current location of the item;
in response to determining that the item tracking session availability trigger has occurred, provide access to the unique webpage associated with the item tracking session to a user device;
identify a first geofence around a final delivery destination of the item at a first threshold distance from the final delivery destination of the item;
identify a second geofence around the final delivery destination of the item at a second threshold distance from the final delivery destination, wherein the first threshold distance is greater than the second threshold distance;
determine access level criteria for the item tracking session based on the current location of the item, wherein the access level criteria comprises first access level criteria, second access level criteria, and third access level criteria; and
updating, based at least in part on the current location of the item, display of the dynamic map and the dynamic icon to indicate the current location of the item by:
determining whether the carrier vehicle is outside of the first geofence;
responsive to determining the carrier vehicle is outside the first geofence, rendering a wide view of the dynamic map and the dynamic icon in a first size on the unique webpage;
determining whether the carrier vehicle is between the first geofence and the second geofence;
responsive to determining the carrier vehicle is between the first geofence and the second geofence, rendering a moderate view of the dynamic map and the dynamic icon in a second size on the unique webpage;
determining whether the carrier vehicle is inside the second geofence; and
responsive to determining the carrier vehicle is inside the second geofence, rendering a close view of the dynamic map and the dynamic icon in a third size on the unique webpage.

12. The apparatus of claim 11, wherein the program code is further configured to, when executed by the at least one processor, cause the apparatus to:
compare item transit progress against the access level criteria; and
modify data available via the item tracking session based on the access level criteria.

13. The apparatus of claim 11, the program code is further configured to, when executed by the at least one processor, cause the apparatus to at least one of:
update the item tracking session continuously;
update the item tracking session at least once during a first time period, wherein the first time period comprises a range of one minutes to five minutes; or
update the item tracking session at least once during a second time period, wherein the second time period comprises a range of five minutes to fifteen minutes.

14. The apparatus of claim 11, wherein the program code is further configured to, when executed by the at least one processor, cause the apparatus to:
generate a notification, wherein the notification comprises a map access link configured to provide access to the unique webpage; and
deliver the notification to the user device.

15. The apparatus of claim 14, wherein the notification is delivered to the user device using one or more of an email, a short message service, or a notification in a user delivery profile.

16. The apparatus of claim 11, wherein determining the item tracking session availability trigger has occurred involves at least one of:
    determining the item is associated with the carrier vehicle;
    determining the item is within a delivery time window; or
    receiving a request to view the item tracking session from the user device.

17. The apparatus of claim 14, wherein the program code is further configured to, when executed by the at least one processor, cause the apparatus to receive a tracking completion signal, wherein the tracking completion signal comprises one or more of:
    a delivery completed notification;
    a delivery not completed notification;
    a tracking error notification; or
    a tracking time out notification.

18. The apparatus of claim 11, wherein prior to the item reaching its final delivery destination, the program code is further configured to, when executed by the at least one processor, cause the apparatus to receive a delivery action request from the user device, the delivery action request indicating a change to delivery of the item.

19. The apparatus of claim 11, wherein the carrier vehicle is selected from at least one of a manned terrestrial vehicle, an unmanned terrestrial vehicle, or an unmanned aerial vehicle.

20. A non-transitory computer-readable storage medium storing program code instructions, wherein when the program code instructions are executed by one or more processors of a computing device, cause the computing device to:
    continuously receiving location information of a carrier vehicle from one or more location sensors associated with at least one of the carrier vehicle or a mobile computing device located within the carrier vehicle, wherein the location information of the carrier vehicle corresponds to a current location of an item;
    generate a unique webpage associated with the item, wherein the unique webpage is configured to display a dynamic map and a dynamic icon generated using renderable map data, and the dynamic map and the dynamic icon identify the current location of the item; and
    updating, based at least in part on the location information, display of the dynamic map and the dynamic icon to indicate the current location of the item as the carrier vehicle moves closer to a final delivery destination for the item by:
        determining the carrier vehicle is within a first range of locations;
        responsive to determining the carrier vehicle is within the first range of locations, rendering a wide view of the dynamic map and the dynamic icon in a first size on the unique webpage;
        determining the carrier vehicle is within a second range of locations;
        responsive to determining the carrier vehicle is within the second range of locations, rendering a moderate view of the dynamic map and the dynamic icon in a second size on the unique webpage;
        determining the carrier vehicle is within a third range of locations; and
        responsive to determining the carrier vehicle is within the third range of locations, rendering a close view of the dynamic map and the dynamic icon in a third size on the unique webpage.

* * * * *

UNITED STATES PATENT AND TRADEMARK OFFICE
CERTIFICATE OF CORRECTION

| | |
|---|---|
| PATENT NO. | : 11,842,318 B2 |
| APPLICATION NO. | : 17/379673 |
| DATED | : December 12, 2023 |
| INVENTOR(S) | : Sumeet Pradeep Shroff et al. |

It is certified that error appears in the above-identified patent and that said Letters Patent is hereby corrected as shown below:

In the Drawings

• Figure 3, reference numeral 320, "COMMUNCATIONS" should read -- COMMUNICATIONS --.

In the Specification

• Column 20, Line 14, "they" should read -- that they --.
• Column 28, Line 37, "FIGS. 8D" should read -- FIG. 8D --.
• Column 31, Line 27, "level including" should read -- level. --.
• Column 35, Line 27, "delivery" should read -- delivery. --.

In the Claims

• Column 37, Line 63, Claim 11, "session wherein" should read -- session, wherein --.
• Column 38, Line 47, Claim 13, "claim 11, the" should read -- claim 11, wherein the --.

Signed and Sealed this
Twenty-seventh Day of February, 2024

Katherine Kelly Vidal
*Director of the United States Patent and Trademark Office*